United States Patent
Keel et al.

(10) Patent No.: US 9,817,562 B2
(45) Date of Patent: Nov. 14, 2017

(54) METHODS AND APPARATUS FOR MANAGING AND EXCHANGING INFORMATION USING INFORMATION OBJECTS

(71) Applicants: Paul Erich Keel, Cambridge, MA (US); Jeffrey Huang, Lausanne (CH)

(72) Inventors: Paul Erich Keel, Cambridge, MA (US); Jeffrey Huang, Lausanne (CH)

(73) Assignee: Paul Erich Keel, Cambridge, MA (US)

( * ) Notice: Subject to any disclaimer, the term of this patent is extended or adjusted under 35 U.S.C. 154(b) by 0 days.

(21) Appl. No.: 15/243,497

(22) Filed: Aug. 22, 2016

(65) Prior Publication Data

US 2016/0357874 A1    Dec. 8, 2016

Related U.S. Application Data

(63) Continuation of application No. 14/664,178, filed on Mar. 20, 2015, now Pat. No. 9,524,090, which is a
(Continued)

(51) Int. Cl.
   *G06F 3/048* (2013.01)
   *G06F 3/0484* (2013.01)
   (Continued)

(52) U.S. Cl.
   CPC ........ *G06F 3/04842* (2013.01); *G06F 3/0482* (2013.01); *G06F 3/04817* (2013.01);
   (Continued)

(58) Field of Classification Search
   CPC .......... G06F 17/30864; G06F 17/3089; G06F 3/0482; G06F 17/30867; G06F 3/04817; G06F 17/30247; G06F 8/10; G06F 17/248; G06F 17/30911; G06F 17/30265; G06F 3/048; G06F 17/30598; G06F 17/241;
   (Continued)

(56) References Cited

U.S. PATENT DOCUMENTS

| 5,008,853 A | 4/1991 | Bly et al. ...................... 364/900 |
| 5,220,657 A | 6/1993 | Bly et al. ...................... 395/425 |

(Continued)

OTHER PUBLICATIONS

Winston et al., *EWall: Electronic Card Wall*, ONR CKM Workshop, Jan. 2004, 20 pages, Publication date unknown.
(Continued)

*Primary Examiner* — Tadeese Hailu
(74) *Attorney, Agent, or Firm* — Sunstein Kann Murphy & Timbers LLP

(57) ABSTRACT

A computer-implemented method of interacting with at least one data item includes configuring each of the data items into a distinct information object by extracting, from each data item, extracted data including a heading, a source, graphical and textual material, and a hyperlink. The method additionally uses the extracted data to make available for display a representation of each of the information objects in a uniform format, wherein the format includes a card, and, within the card, an icon area for graphical and textual material, the heading, the source, a set of indicators, and a mechanism giving graphical access to a set of functions.

22 Claims, 15 Drawing Sheets

Related U.S. Application Data continuation of application No. 13/925,031, filed on Jun. 24, 2013, now abandoned, which is a continuation of application No. 12/563,416, filed on Sep. 21, 2009, now Pat. No. 8,499,248, and a continuation-in-part of application No. 11/118,301, filed on Apr. 29, 2005, now Pat. No. 7,640,511.

(60) Provisional application No. 61/116,747, filed on Nov. 21, 2008, provisional application No. 60/566,723, filed on Apr. 29, 2004.

(51) Int. Cl.
| | | |
|---|---|---|
| *G06F 17/30* | (2006.01) | |
| *G06Q 10/10* | (2012.01) | |
| *G06F 3/0481* | (2013.01) | |
| *G06F 3/0482* | (2013.01) | |
| *H04L 12/58* | (2006.01) | |
| *H04L 29/08* | (2006.01) | |

(52) U.S. Cl.
CPC .... *G06F 17/3087* (2013.01); *G06F 17/30241* (2013.01); *G06F 17/30312* (2013.01); *G06F 17/30569* (2013.01); *G06F 17/30867* (2013.01); *G06Q 10/10* (2013.01); *H04L 51/046* (2013.01); *H04L 67/10* (2013.01); *Y10S 707/99933* (2013.01); *Y10S 707/99943* (2013.01)

(58) Field of Classification Search
CPC .............. G06Q 50/01; G06Q 30/0269; G06Q 10/1095; G06Q 30/0643; H04L 51/32; H04L 51/10; H04L 63/10
See application file for complete search history.

(56) References Cited

U.S. PATENT DOCUMENTS

| | | | |
|---|---|---|---|
| 5,732,229 A * | 3/1998 | Dickinson | G06Q 10/10 715/764 |
| 6,049,806 A * | 4/2000 | Crecine | G09B 5/14 |
| 6,092,067 A | 7/2000 | Girling et al. | 707/100 |
| 6,119,147 A | 9/2000 | Toomey et al. | 709/204 |
| 6,266,649 B1 | 7/2001 | Linden et al. | 705/26 |
| 6,289,362 B1 | 9/2001 | Van Der Meer | 707/501 |
| 6,327,590 B1 | 12/2001 | Chidlovskii et al. | 707/5 |
| 6,415,316 B1 | 7/2002 | Van Der Meer | 709/203 |
| 6,597,377 B1 | 7/2003 | MacPhail | 345/738 |
| 6,724,403 B1 | 4/2004 | Santoro et al. | 345/765 |
| 6,768,999 B2 | 7/2004 | Prager et al. | 707/102 |
| 6,781,920 B2 * | 8/2004 | Bates | G06Q 10/109 368/10 |
| 6,829,619 B1 | 12/2004 | Wakamatsu et al. | 707/104.1 |
| 6,912,505 B2 | 6/2005 | Linden et al. | 705/14 |
| 6,931,591 B1 | 8/2005 | Brown et al. | 715/517 |
| 6,973,456 B1 | 12/2005 | Elgart | 707/10 |
| 7,028,264 B2 | 4/2006 | Santoro et al. | 715/765 |
| 7,062,242 B2 | 6/2006 | Dajer et al. | 455/232.1 |
| 7,113,917 B2 | 9/2006 | Jacobi et al. | 705/14 |
| 7,478,054 B1 | 1/2009 | Adams et al. | 705/26 |
| 7,478,078 B2 | 1/2009 | Lunt et al. | 707/1 |
| 7,543,237 B2 | 6/2009 | Kontny et al. | 715/759 |
| 7,681,112 B1 | 3/2010 | Francis | 715/201 |
| 7,765,490 B2 | 7/2010 | Lai et al. | 715/810 |
| 7,904,323 B2 | 3/2011 | Wynn et al. | 705/8 |
| 7,921,368 B2 | 4/2011 | Moody et al. | 715/751 |
| 7,941,444 B2 * | 5/2011 | Cragun | G06F 17/30873 707/784 |
| 8,042,063 B1 * | 10/2011 | Lin-Hendel | G06F 3/0482 715/805 |
| 8,078,615 B2 | 12/2011 | Smith et al. | 707/732 |
| 8,249,885 B2 * | 8/2012 | Berkowitz | G06F 17/30873 705/1.1 |
| 8,392,834 B2 | 3/2013 | Obrador | 715/723 |
| 8,743,148 B2 | 6/2014 | Gegner et al. | 345/660 |
| 2001/0003214 A1 * | 6/2001 | Shastri | G06F 17/30796 725/109 |
| 2002/0016725 A1 | 2/2002 | Eichstaedt et al. | 705/5 |
| 2002/0080180 A1 | 6/2002 | Mander et al. | 345/769 |
| 2002/0105541 A1 * | 8/2002 | Endou | G06F 17/3005 715/738 |
| 2002/0143877 A1 | 10/2002 | Hackbarth et al. | 709/205 |
| 2002/0147661 A1 * | 10/2002 | Hatakama | G06Q 30/06 705/26.8 |
| 2002/0169737 A1 | 11/2002 | Armstrong et al. | 706/59 |
| 2002/0186257 A1 * | 12/2002 | Cadiz | G06F 17/30867 715/838 |
| 2003/0009493 A1 | 1/2003 | Parker et al. | 707/500.1 |
| 2003/0030678 A1 * | 2/2003 | Rosenholtz | G06F 17/30855 715/838 |
| 2003/0135565 A1 | 7/2003 | Estrada | 709/206 |
| 2003/0158855 A1 | 8/2003 | Farnham et al. | 707/102 |
| 2003/0158893 A1 * | 8/2003 | Komatsu | G06Q 30/02 709/203 |
| 2003/0164856 A1 * | 9/2003 | Prager | A63F 7/0676 715/764 |
| 2003/0208397 A1 | 11/2003 | VanDusen | 705/14 |
| 2003/0217056 A1 | 11/2003 | Allen et al. | 707/7 |
| 2004/0003097 A1 | 1/2004 | Willis et al. | 709/228 |
| 2004/0049541 A1 | 3/2004 | Swahn | 709/203 |
| 2004/0054428 A1 | 3/2004 | Sheha et al. | 700/56 |
| 2004/0083274 A1 | 4/2004 | Katiyar et al. | 709/217 |
| 2004/0153445 A1 | 8/2004 | Horvitz et al. | 707/3 |
| 2004/0177319 A1 * | 9/2004 | Horn | G06F 17/3002 715/205 |
| 2004/0193673 A1 | 9/2004 | Samji et al. | 709/200 |
| 2004/0201609 A1 | 10/2004 | Obrador | 345/723 |
| 2004/0205514 A1 * | 10/2004 | Sommerer | G06F 17/212 715/205 |
| 2004/0261013 A1 | 12/2004 | Wynn et al. | 715/511 |
| 2004/0267700 A1 | 12/2004 | Dumais et al. | 707/2 |
| 2005/0080807 A1 | 4/2005 | Beilinson et al. | 707/102 |
| 2005/0154639 A1 | 7/2005 | Zetmeir | 705/14 |
| 2005/0165880 A1 | 7/2005 | Moody et al. | 709/200 |
| 2013/0073425 A1 | 3/2013 | Hellal et al. | 705/26.8 |

OTHER PUBLICATIONS

Winston et al., *EWall: Electronic Card Wall*, ONR CKM Workshop, Maryland, Jan. 2003, 25 pages, Publication date unknown.
Winston et al., *EWall: Electronic Card Wall*, ONR TC3 Workshop, San Diego, Jan. 2002, 26 pages, Publication date unknown.
Winston et al., *EWall: Electronic Card Wall*, ONR TC3 Workshop, San Diego, Nov. 2000, 8 pages, Not publicly released.
Fleming, *DCODE: Decision Making Constructs in a Distributed Environment*, ONR CKM Workshop, Maryland, Jan. 2003, 60 pages, Publication date unknown.
Fleming, *DCODE: Decision Making Constructs in a Distributed Environment*, ONR CKM Workshop, San Diego, Jan. 2004, 71 pages, Publication date unknown.
Fleming, *Information Exchange and Display in Asynchronous C2 Group Decision Making*, Jun. 2003, 38 pages, Publication date unknown.
Freeman et al., *Collaborative Critical Thinking*, ONR CKM Workshop, Maryland, Jan. 2003, 39 pages, Publication date unknown.
Warner et al., *CASC: The Process of Achieving Collaborative Knowledge in Asynchronous Collaboration*, ONR CKM Workshop, San Diego, Jan. 2004, 53 pages, Publication date unknown.
Bordetsky, *NPS GIGA Lab Testbed for CKM Projects*, ONR CKM Workshop, San Diego, Jan. 2004, 47 pages, Publication date unknown.
Anon., *EWall: Electronic Card Wall, Abstract*, in a screen capture taken from www.archive.org for date Jun. 6, 2001 of web page at ewall.mit.edu/abstract/index.html, Publication date unknown.
Winston, et al., *EWall: Computational Support for Decision Making in Collaborative Environments*, in a screen capture taken from www.archive.org for date Aug. 2, 2003 of web page at www.ai.mit.edu/research/ abstracts/ abstracts2002/user-interfaces/32winston. pdf, Publication date unknown.

(56) References Cited

OTHER PUBLICATIONS

Anon., *News View Examples*, in screen captures taken from www.archive.org for (a) date Apr. 19, 2001 of web page at destech.mit.edu/keel/test/news/share.pl and (b) date Apr. 7, 2003 of web page at ia.eversitas.com and (c) date Jun. 17, 2002 of web page at destech.mit.edu:80/phw/news/news.html.
Keller R. et al. A bookmarking service for organizing and sharing URLs. Computer Networks and ISDN Systems 29 (1997) 1103-1114.
Rouding M. Informal Awareness and Causal Interaction with the Notification Colleague. Master Thesis. Dept. of Computer Science, University of Calgary, Alberta, Canada. Apr. 19, 2004.
Greenberg S. et al. The Notification Collage: Posting Information to Public and Personal Displays. Yellow Series Report 2000-667-19, Dept. of Computer Science, University of Calgary, Alberta, Canada. Sep. 14, 2000.
itList.com, Apr. 1996, May 29, 2004.
Backflip.com, 1999, Jun. 23, 2004.
Clickmarks.com, 1999, Oct. 12, 1999.
HotLinks.com, 2000, Feb. 11, 2002.
del.icio.us, 2003, Dec. 20, 2005.
SPURL.net, 2004, Oct. 21, 2004.
StumbleUpon.com, 2001 (estimated), Jun. 16, 2004.
Flickr.com, Feb. 2004, Jun 7, 2004.
TheFacebook.com, Feb. 2004, 2005 (estimated).
LiveJournal.com, 1999, Dec. 15, 2003.
Multiply.com, Mar. 2004 (estimated), Jun. 19, 2004.
Friendster.com, 2002, Sep. 2003 (estimated).
MySpace.com, Aug. 2003, Apr. 4 2005 (estimated).
LinkedIn.com, May 2003, 2004 (estimated).
Blogger.com, 1999, Mar. 31, 2004.
Eastgate Tinderbox, 2002, Jun. 6, 2004.
Hi5.com, 2003, (unknown).
Xanga.com, 1998, Jan. 21, 2006 (estimated).
AsianAve.com, 1997, 2007 (estimated).
MiGente.com, 2000, Jun. 3, 2004.
vBulletin, 2000, Jun. 10, 2004.
phpBB, 2000, Feb. 24, 2004 (estimated).
Orkut.com, Jan. 2004, Nov. 2004 (estimated).
Photobucket.com, May 3, 2003, Aug. 13, 2004.
ImageShack.us, Nov. 12, 2003, Aug. 3, 2004.
SixDegrees.com, 1997, Dec. 6, 2000.
Reblog.org, 2003, Mar. 27, 2004.
WebShotes.com, 1995, Jul. 3, 2004.
Fotopic.com, 1999, Jun. 6, 2004.
SanpFish.com, 2000, Jun. 3, 2004.
SmugMug.com, 2002, Jul. 12, 2004.
Amazon.com, 1994, Jul. 2, 2004.
DeviantArt.com, 2002, Jun. 14, 2004.
Fotki.com, 1998, Jun. 9, 2004.
ShutterFly.com, 1999, Jun. 16, 2004.

\* cited by examiner

1. Buddy List
2. Object (Discussion Subject)
3. Message Indicator (Counter)
4. Object / Discussion Heading
5. Collaborative Ratings
6. Shared Files (List or Thumbnails)
7. Threaded Discussion
8. Participants
9. Meta-data and shared applications 1. Buddy List
2. Object (Discussion Subject)
3. Message Indicator (Counter)
4. Object / Discussion Heading
5. Collaborative Ratings
6. Shared Files (List or Thumbnails)
7. Threaded Discussion
8. Participants
9. Meta-data and shared applications

METHODS AND APPARATUS FOR MANAGING AND EXCHANGING INFORMATION USING INFORMATION OBJECTS

RELATED APPLICATIONS

This application is a continuation of U.S. patent application Ser. No. 14/664,178, filed Mar. 20, 2015, which is a continuation of U.S. patent application Ser. No. 13/925,031, filed Jun. 24, 2013, which is a continuation of U.S. patent application Ser. No. 12/563,416, filed Sep. 21, 2009 (now U.S. Pat. No. 8,499,248, issued Jul. 30, 2013), entitled "METHODS AND APPARATUS FOR MANAGING AND EXCHANGING INFORMATION USING INFORMATION OBJECTS," which (i) claims the benefit of U.S. provisional application Ser. No. 61/116,747, filed Nov. 21, 2008, entitled "Information Objects (IOs) and Information Views (IVs)", and (ii) is a continuation in part of U.S. patent application Ser. No. 11/118,301, filed Apr. 29, 2005 (now U.S. Pat. No. 7,640,511, issued Dec. 29, 2009), entitled "METHODS AND APPARATUS FOR MANAGING AND INFERRING RELATIONSHIPS FROM INFORMATION," which claims the benefit of U.S. provisional application having Ser. No. 60/566,723, filed Apr. 29, 2004, entitled "METHODS AND APPARATUS FOR MANAGING AND INFERRING RELATIONSHIPS FROM INFORMATION". All of these related applications are hereby incorporated herein by reference in their entirety.

STATEMENT REGARDING FEDERALLY SPONSORED RESEARCH

This invention was made with Government support under Grant and/or Contract No. 'N00014-02-1-0132 and/or N00014-04-1-0569 and/or N00014-08-C-0206' awarded by the Office of Naval Research. The Government has certain rights in the invention.

BACKGROUND

Modern information processing systems allow users to collect and process large amounts of information. As an example, a typical computer system such as a personal computer includes an operating system that executes within the computer system to provide a graphical user interface to users of that computer system. A conventional graphical user interface typically includes a number of information objects such as graphical icons that represent information of relevance or importance to the user. The user accesses data and controls functionality of the computer system by selecting and operating such icons. By way of example, software applications such as word processors, graphical editing tools, web browsers and many others often provide graphical user interfaces that include a number of icons that have visual meaning to the user of the computer system. Typically, a software application renders icons to allow the user to invoke specific functionality or commands of that application and/or to allow the user to organize and access data. Many software applications use icons to represent data or files that the user can access by selecting (e.g., clicking) the icon representing the data. As an example, if a user selects an icon that represents a software application installed within the computer, the computer will begin execution of that application. Other icons on a graphical user interface can represent folders or files maintained by the operating system within a file system.

Many conventional software applications allow a user to develop or collect various portions of information or content for storage and future access. As an example, a word processor or other editing tool allows the user to create and edit documents. As another example, a web browser allows a user to navigate web pages provided by servers on remote computer networks such as the Internet to reference information on a variety of subjects. A conventional computer system allows a user to store information referenced or created by such applications as a set of documents or files that can be retrieved by the user at a later time.

Most conventional operating systems and many software applications also provide a way for a user to arrange a file system of the computer in order to organize documents and files in a manner that makes sense to the user. Computer operating systems typically organize file systems in a hierarchical manner allowing the user to create folders or directories with user-specified names. The user can store files within the folders in a manner that makes sense to that user. A file system is thus one of the most popular ways for users to organize and manage data and information of interest to those users.

Another mechanism that conventional applications and operating systems provide to allow users to organize and manage information of interest to that user is the ability to allow a user to spatially arrange information objects such as graphical icons in a way that makes intuitive sense to the user. As an example, on a conventional "desktop" work area provided by many operating systems, a user can place or position icons representing files, documents, applications, email messages, appointments or the like in any manner and at any position that the user may choose. In particular, such conventional applications allow the user to graphically maneuver the icons into position in relation to one another in a manner that makes sense to that user. Different users often organize icons on their desktop in different ways.

Information availability and accessibility is continuously increasing. The problem is that information commonly exists in different formats, resides in different locations, is dynamically changing, and is used and modified by different people. This makes it difficult for users to effectively monitor, analyze and exchange information.

SUMMARY

Conventional mechanisms and techniques that allow a user to visually organize, collect and manage information objects that represent various portions of information suffer from a variety of deficiencies. In particular, conventional computer-based applications such as operating system desktops and software application graphical user interfaces allow a user to collect and store numerous portions of content and information that are of interest to the user and allow a user to represent that information graphically (e.g. via icons), but do little to analyze relations that may exist between the icons and/or between the stored portions of content or data.

In particular, conventional information processing systems such as those noted above allow a user to organize and arrange various portions of data or other information as icons in a graphical user interface in a manner that makes sense to the user, but such systems do not promote conversations and collaboration among users.

Another deficiency with conventional information processing systems is that information is represented in different formats and, depending on the format, is stored in different locations. For example, conventional browsers store hyperlinks to web sites as bookmarks, whereas emails are located in mailboxes in mail handlers, files are stored in computer directories, and notes may be stored in files, and so forth. The proposed information object mechanism disclosed herein, referred to in some embodiments as IOs, solve this deficiency by introducing a standardized information format that represents a piece of information in an abstract way and links to an original piece of information and that has a standardized look thus allowing users to focus on and compare the information content and context rather than be distracted by the information format and location.

As an example of problems with conventional data processing systems, a user using a conventional content development application may spend large amounts of time collecting portions of content such as graphics, text, news stories, web pages, email messages, or other such information sources for collaborative production of a large content-based research project. Many users may be involved in this process. As each user collects portions of information using conventional information management systems, the users store and organize their respective portions of information within the computer file system. Each user may create icons on his or her desktop or other work areas that represent the respective portions of collected information. Each user might group icons for related pieces of information together in a list, within close proximity to each other, or in file directories. In conventional systems however, it is up to the user to identify what other portions of information might be of interest to the user that the user has not already identified and collected.

As an example, if the collaborative production being developed by the users is a project related to current events, each user may collect articles and stories related to that current event. Using conventional systems, it is up to each user to research and discover stories or other content related to that current event that might be available from a variety of different information sources. While conventional collaboration systems might provide a common repository for such collected information contributed by each user, there is little or no ordering to this information, other than an order specified by the users who place the content into the shared repository such as a file system or database. Each user must frequently communicate with other users in a highly manual manner (e.g. via a telephone call, email or other mechanism) to identify content that other users may have discovered and collected that might be of relevance to the production under development.

Such conventional information management systems do not automatically and dynamically analyze relations between user placed icons that represent the various pieces of available information in order to assist users in identifying other portions of content that many of interest to those users. More specifically, conventional systems do not analyze specific spatial relations, collaborative context relations, chronological context relations, and the like between information sources associated with icons arranged by a user to determine other portions of information, such as other portions of content collected by other users, that may be of relevance or interest to the user providing a specific spatial arrangement of his or her icons. As a result, conventional information management systems limit a user's knowledge of other available content and information to which that user may have interest. In particular, such systems limit available content to that content that a user can discover on their own.

As an example, using a conventional information discovery processes such as web searching, a user can quickly become overwhelmed with search results that are irrelevant to the information they are seeking. While some conventional web sites may attempt to suggest references to web pages that are similar in nature to those discovered when providing a particular search term, such additional references are simply provided based on frequently performed searches of other users and do not take into account current information already collected by the user performing the original search. Thus a conventional browser is not made aware that a user already has collected certain related pieces of information and has organized them in a spatially related manner.

In contrast, embodiments of the invention are based in part on the observations that conventional information collection management systems provide a significant cognitive burden on users caused by the increasing availability of information, the requirement for users to actively initiate a search for relevant information, the requirement for evaluation of the quality and feasibility of information, the need to collaborate remotely and asynchronously, as well as the necessity to dynamically adapt to changing circumstances. Modern information processing systems do not provide an automated ability to organize and identify information sources that come in many different formats. For example, information may be received in the form of a phone call, an email, an instant message, a computer file, a web site, a database item, a verbal comment, a radio transmission, a newspaper, a television spot, a magazine, or a security camera. The various formats often prevent the easy and efficient collection, organization, and comparison of information by conventional information processing systems.

Embodiments of the invention incorporate advanced graphical user interfaces and functions to address the shortcomings in conventional systems. These embodiments include Information Objects (IOs) and Information Views (IVs). IOs that are data files that can include other data files (such as documents, hyperlinks, and executables) as well as meta-data (such as ratings, discussion logs, and visualization parameters). IVs are computer windows for the visualization of IOs. IOs are rendered differently on different IVs allowing users to manage information in a customized format and in environments suited to particular tasks and circumstances. In certain embodiments the IO consolidates data, meta-data and communication features. For example, the IO can be an agenda item, a discussion, a hosted conversation, a topic, etc. Accordingly, the user can efficiently view and organize multiple IOs that represent different topics and that engage different groups of participants.

Advantageously IOs provide a means for users to package and visualize (static and dynamic) information in a standardized format. IOs can be viewed and modified differently on different IVs. IOs can be copied between the IVs of the same or different users. Copies of IOs remain synchronized if displayed on different IVs. IOs are associated with functions that enhance the collaborative use of information, for example, an object-based communication system that allows users to communicate through IOs and IVs.

Other benefits of Information Objects and Views include the ability to: consolidate task relevant information (e.g. from shared IVs to a private IVs);

display information in a custom and familiar format (e.g., in a wide variety of possible custom IVs);

maintain a standardized data format for different data visualization and management tools; and easily move data between different data visualization and management tools; and easily exchange information among remotely distributed participants in a hosted conversation.

Using techniques disclosed herein, it is possible to create IOs transfer IOs between the same or different types of IVs, add additional IVs and additional functions for IOs, as well as a selection of IO components, IO functions on IVs. An electronic wall (EWall) embodiment provides one example for the visualization of IOs on an information view (IV) in which an IO can present itself as a EWall IO on a EWall Workspace View. A graphical user interface is provided for the management of multiple IVs, as well as new functions for the exchange of IOs and the collaborative use of IVs.

Embodiments of the invention as disclosed herein provide mechanisms and techniques for providing the IO, sharing the IO among a plurality of participants, attaching multimedia data to the IO. The technique further includes displaying the IO in one of a plurality of views and in response to interaction with one of the plurality of views by one of the participants, communicating with at least one different one of the participants sharing the IO.

The system disclosed herein provides a computational environment for the support of individual and collaborative decision-making and greatly enhances the quality and the speed of individual and collaborative brainstorming, problem-solving, information collecting and decision-making processes. More specifically, the system for providing hosted conversation among a group of participants disclosed herein includes a processor, a memory unit that stores instructions associated with an application executed by the processor, and an interconnect coupling the processor and the memory unit, enabling the computer system to execute the application and perform operations of: storing a link to at least one information object, the at least one information object, the information object includes at least one link to a document, a plurality of links to the group of participants, meta-data related to the conversation, and a communication system linking the at least one information object to the group of participants. The system further provides a user interface on the client system comprising: an icon representing the at least one information object, a contact list, a list of participants linked to the at least one information object and an information view to visualize the at least on information object.

In one configuration, the IOs are sometimes represented as "cards" on a graphical user interface. IOs reference different types of information formats thus making it easier for users to directly compare and study information in different formats. As used herein the term "card," "IO" and "information object" are used interchangeably, and a card is one example configuration or representation of an information object. AN IO includes a graphic icon area to display text or a picture associated with an information source, as well as other information pertaining to such things as ownership of that IO, creation time of the IO, and attribute indicators that indicate a current state of the IO, and a hyperlink to its associated information source. In a simplest embodiment, an IO is just an icon that represents some information and information represented by IOs may be stored in different locations and in different formats. In one configuration, an IO is different from an ordinary icon because it comes with hidden functionality such as a built-in instant messaging system and the ability to drag and drop content onto the IO. It is noted that the: instant messaging system includes communication media such as Instant Messaging System, email and SMS messaging, text messaging and other forms of real-time communication between participants.

In one configuration, the system applies a spatial relation algorithm that discovers spatial relations between positional information of at least two IO records in an IO database that are associated with IOs displayed on the graphical user interface in the first set of IOs. The relations between IOs can be stored in a database and the system can use discovered relations to identify a second set of information objects based on the relation(s) between the first set of information objects/IOs. The second set of information objects in an IO configuration is a second set of IOs that might be of interest to the user based on the analysis of the IOs already on display in a Workspace View associated with that user. The system can output an identity of the second set of information objects by displaying the second set of IOs on the graphical user interface for viewing by the user. The second set may be displayed in a prioritized and relevant manner based on relations discovered concerning the first set of IOs.

In this manner, the system can use IOs to show the user other sources of information, possibly from other users, or from a database, or from a dynamic source such as a news feed, that might be of interest to that user. News feeds include but are not limited to news, alerts, announcements, motion detection events triggering security cameras, emails, instant messages (IMs), short message services (SMSs), sensors, real time search results, and custom content. The system can thus assist a user in managing information and retrieving relevant information.

Embodiments of the invention include any type of computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include various graphical representations of the IOs themselves, for example as displayed on a graphical user interface as will be explained in more detail.

It is to be understood that the system of the invention can be embodied strictly as a software program, as software and hardware, or as hardware alone such as within a processor, or within an operating system or within a software application.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
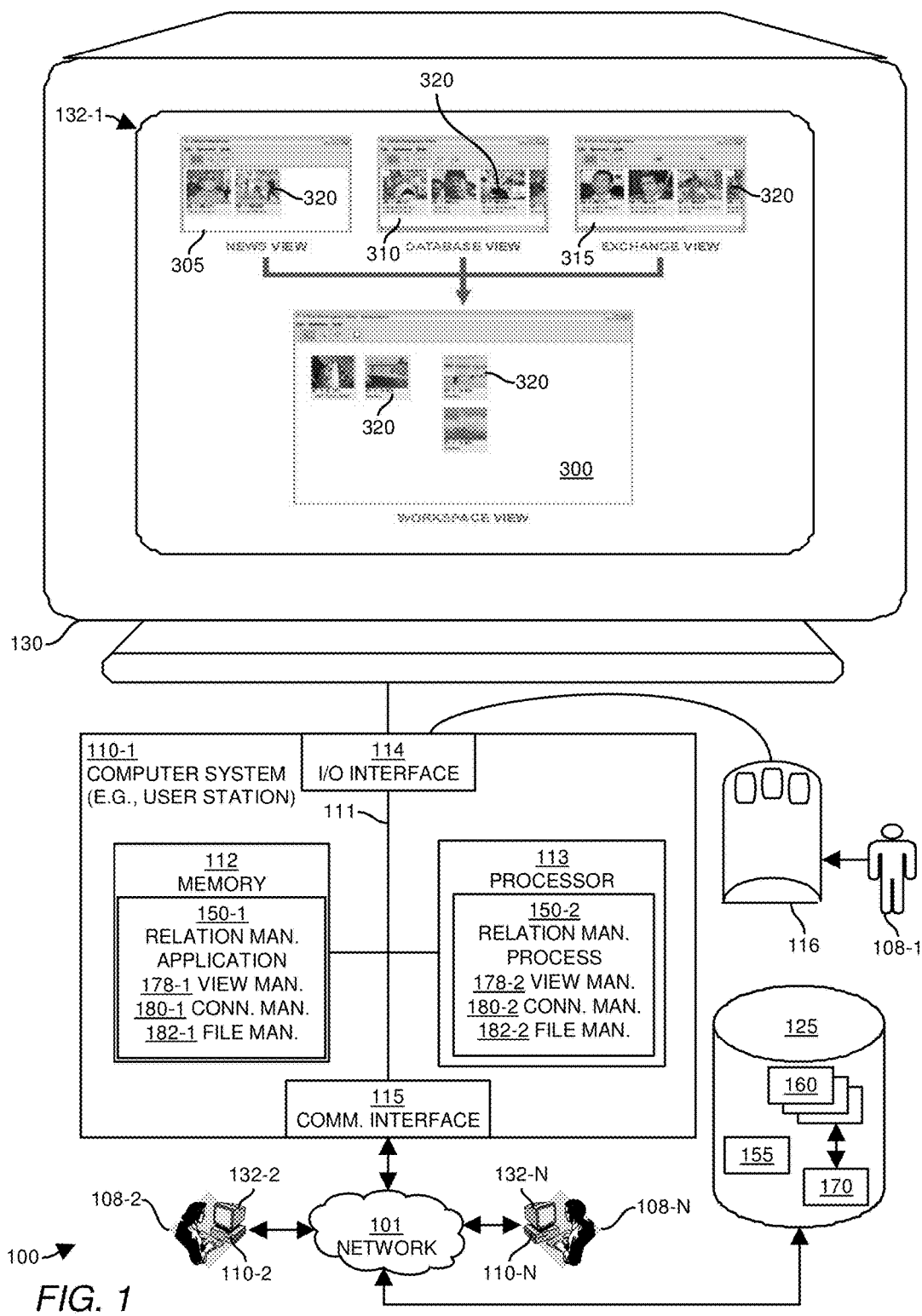
FIG. 1 is an example network environment including computer systems configured with a relation manager in accordance with one example embodiment disclosed herein.

FIG. 1 illustrates the computer-networking environment 100 suitable for use in explaining example embodiments of invention. The computer-networking environment 100 includes a network 101 such as a local area network (e.g., LAN) that interconnects a plurality of computer systems 110-1 through 110-N that each execute respective relation managers 150 (application 150-1 and process 150-2), view manager managers 178 (application 178-1 and process 178-2), connections managers 180 (application 180-1 and process 180-2) and IO file managers 182 (application 182-1 and process 182-2) under respective control of a plurality of users 108. The computer systems 110 may be any type of computerized device such as a personal computer, laptop, workstation, mainframe terminal, or the like. In this example, each computer system 110 generally includes in interconnection mechanism 111 such as a data bus, motherboard or other circuitry that interconnects a memory 112, a processor 113, an input output interface 114 and a communications interface 115. A display 130 such as a computer monitor and input output mechanism 116 couple to the computer system 110 via the input output interface 114. The communications interface 115 allows communication with other computer systems 110-2 through 110-N over the network 101. The architecture of the computer system 110-1 is shown in FIG. 1 by way of example only. It is to be understood that the details of the example computer systems 110-2 through 110-N can be similar to those of computer system 110-1 but are not shown in FIG. 1 due to drawing space limitations.

The memory 112 within each computer system 110 may be any type of computer readable medium such as random access memory (RAM), read only memory (ROM). The memory 112 may be fixed or removable from the computer system 110, such as a floppy disk, magnetic disk, optical disk media (e.g., CD ROM) or the like.

In one embodiment, the memory 112 is encoded with computer program logic (e.g., software code) that includes a relation manager application 120-1. When the processor 113 executes the relation manager application 150-1, the processor 113 produces a relation manager process 150-2 that executes as explained herein to produce a graphical user interface 132-1 (the example being produced by the relation manager 150 in computer 110-1) on the display 130 for viewing by the user 108. The relation manager process 150-1 and application 150-2 are collectively referred to herein as simply the relation manager 150. When referring to the relation manager 150, it can thus be a reference to the executing process 150-2, the application code 150-1, or both. Each relation manager 150 in combination with the view manager 178, connections manager 180 and file manager 182 process files and documents and produce a graphical user interface 132 that provides, to the user 108, visual knowledge representation, dynamically updated content, hosted conversations, and interpretation and management based in part on spatial relationships. To do so, the managers 150, 178, 180 and 182 include a workspace server 151, a news server 152, an exchange server 153 and a database server 154 that each produce, respectively, a Workspace View 300, a News View 305, a database view 310 and an exchange view 315 within the graphical user interface 132. The relation manager 150 adds discovered relations to IO's in a database 125 (the database 125 may already include relations that other people or software products added). The relation manager also provides the algorithms 155 to examine the network of relations to discover potentially relevant information.

The database 125 maintains a history of updates to the IOs to allow for inclusive reconstruction of a particular IO at given time.

The workspace server 151 produces the Workspace View 300 that in one configuration is a graphical user work area, such as a desktop, in which a user 108 is able to create and manipulate graphical information objects 310 that graphically represent information objects of interest to user 108. The Workspace View 300 helps users 108 to create, collect, organize and understand information associated with each IO 320 and the relationships among information represented by the IO 320. In one configuration, a generic client application such as a web browser accesses such views from respective servers 151 through 154 that may execute on the same or different computer systems 110. In another alternative configuration, a dedicated client application includes or provides the Workspace View, the News View, the database view, and the exchange view and implements the news server, the database server, and the exchange server. It is to be understood that the system described herein may be distributed or centralized and may operate among many computer systems with many users 108.

Information Objects (IOs) are flexible data structures and can include data files that can include other data files as well as meta-data (for the display of IO contents and the use of IO functions on different IVs), present themselves differently depending on the IV they are displayed on, include the same data and functionality on any IV they are displayed on. IOs can be copied or transferred between the same or different types of IVs, copied or transferred between the IVs of the same or different users, remain synchronized if copied to multiple IVs, synchronized with dynamic data sources other than source-IOs, moved from an IV to the computer desktop, file system, or 3rd party applications, thus converting an IO into a regular computer file that can be exchanged through conventional means such as email or file sharing and can be moved from the computer desktop, file system or 3rd party applications to any IV.

Information Views (IVs) can include graphical user interfaces that render IOs in different ways (can be described as a optical lenses that allows users to view information in different ways) and can enable access to all IO parameters and functions.

Using system 110 a user can interact with an information object, the system 110 facilitates sharing the IO among a plurality of participants; provides controls for attaching multi-media data to the IO, displays the IO in one of a plurality of views; and in response to interaction with one of the plurality of views by one of the participants, provide a communications path between at least two of the participants sharing the IO.

Figure 2:
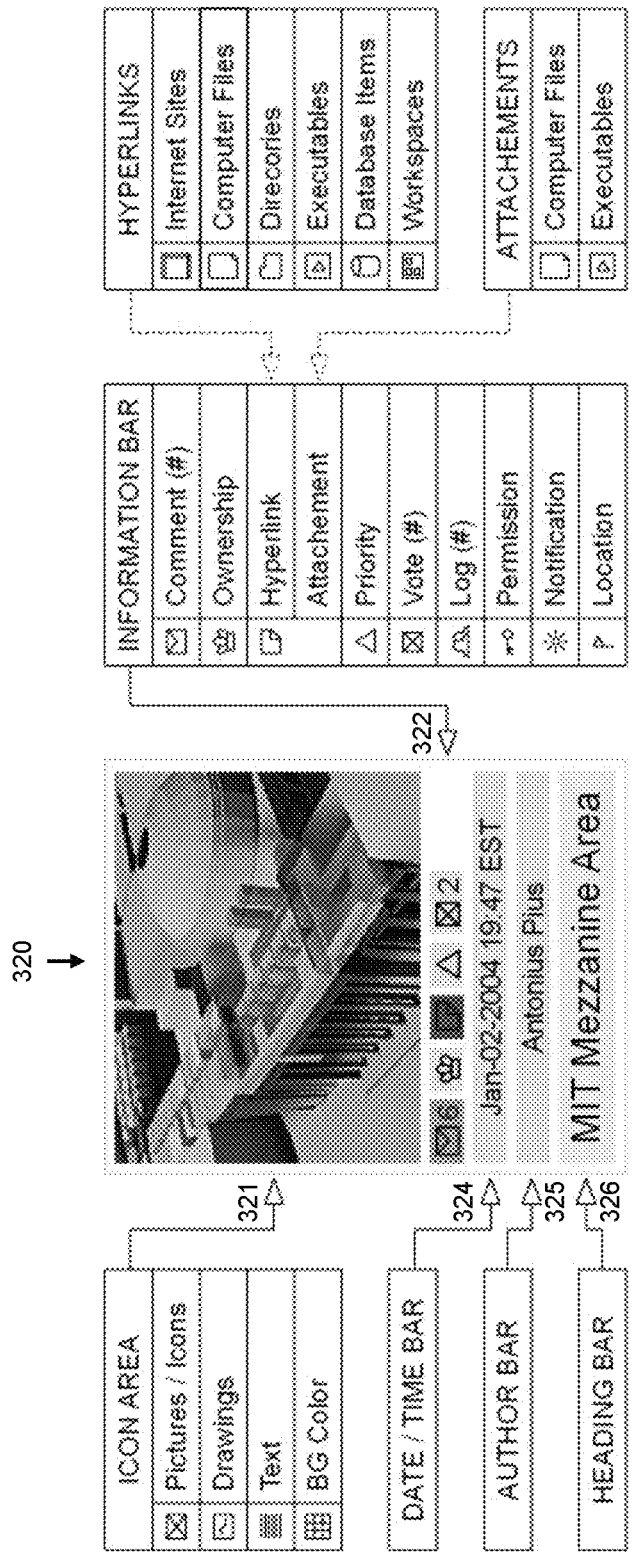
FIG. 2 shows an example layout of an IO in accordance with one example embodiment disclosed herein.

Directing attention briefly to FIG. 2, an example layout of an information object (IO) 310 is shown. An IO 320 in this example provides a visually compact, standardized, and abstract representation of information that displays, reminds of, and/or links to the original piece of information associated with that IO 320. Generally, an IO 320 is any graphical representation of an information object and may be considered the information object itself. The term "IO" as used herein can thus include anything from a simple icon that represents something such as a web page, a document, or a live information source, or an IO can be a more complex representation of such things. Both, the layout and the functionality of IOs 320 are highly modular in one configuration. This means that visual components and computational features can be individually turned on and off, and that additional visual components and computational features can easily be integrated. Furthermore, the colors and fonts of all IO components are customizable. In one embodiment, IOs 320 are visually subdivided into six segments in one configuration that can expand and contract depending on their contents.

The icon area 321 allows for the placement of graphical and/or textual material that can help users 108 to quickly visually locate IOs among many other IOs as well as to memorize and recall the data, information or knowledge associated with that IO 320. Users 108 can copy and paste pictures and text from various computer applications into the icon area. Users can also drag and drop pictures and text from web browsers and file managers into the icon area 321. Furthermore, users can directly draw and write into the icon area 321. The background color of the icon area 321 is also customizable allowing users to visually group and highlight IOs. Typically, the icon area 321 includes an IO graphic such as an icon, picture or other graphical information that represents information associated with that IO. As an example, if an HTML document such as a web page is of interest to a user, that user can create an IO to represent that web page. The IO can include a picture from the web page or a reduced sized version of the web page as its graphic.

The IOs 320 include an information bar 322 that accommodates an interface and visual indicators for complementary IO functions. A small rectangular box that includes an icon or in some cases a numerical counter represents each available IO function. Three distinct colors visually indicate the status of each function. In one configuration, the color gray is used for inactive functions, the color green is used for active functions and the color red is used for functions that require user attention. Every function can be individually turned on and off. The information bar 322 also allows for the customization and addition of functions specific to particular situations and work tasks. The following is a list of example functions and is not intended to limit the invention to information objects (e.g., IOs 320) including such functions. A reference function allows users to hyperlink or to attach related information. A location function is used to associate IOs 320 with a geographic location. The location Algorithm indicates geographic locations for which cards (IOs) are available. In other words, if a card (IO) is associated with a geographic location then the Location Algorithm will represent this card with an icon on a map. Multiple cards in similar geographic locations do not produce multiple icons but a single icon of enlarged size. A typical application is a newspaper that marks on a world map all locations for which news is available. A control function enables automatic IO updates. A comment function allows for the addition of comments and annotations. A vote function allows collaborating users to exchange their opinions about the relevance of IOs. Every user is given one supporting vote for each card (IO). The icon color indicates the addition of recent and the presence of past votes. The numerical counter next to the icon displays the total number of supporting votes. An access log function provides users with a detailed record about the IO history. The Log Function provides users with a detailed record indicating the dates, times and names of all users that previously viewed, copied or modified the card (IO). The icon color indicates recent and past log entries. The counter next to the icon displays the number of log entries. This functionality allows users to review the evolution, collaborative use, and authorship history of cards (IOs). A personal note function is used to announce and send IOs 320 to specific users. A priority function allows users to categorize and highlight IOs.

The date/time bar 324 displays the date and time of the most recent IO modification. The relation manager 150 can use the date/time bar indication to reconstruct the chronology of contributions from different users and sources. The author bar 325 displays the name of the user who last modified the IO 320 or the information source the IO 320 has been copied from. The author bar 325 provides an indication of the IO editor and is used to compare contributions from different users and sources. The heading bar 326 allows users 108 to complement IOs 320 with a brief description or some keywords such as a title. The heading bar 326 effectively complements the icon area 321 by introducing language as an additional means for the abstract representation of data, information and knowledge. While the icon area 321 is particularly useful for the visual navigation of large IO arrangements, the heading bar 326 is focused on supporting the quick and easy recollection of IO meanings and contents.

The creation and use of IOs 320 can fundamentally shift the way analysts and decision-makers comprehend and think about information during sense-making activities. The creation of IOs 320 engages users 108 into a process of converting, standardizing, abstracting, and associating information while the use of IOs 320 fosters a strong focus on relating information uninfluenced by the format and location of information. Humans like to think of data, information and knowledge as objects that they collect, compare, and organize. The conversion of data and information (as well as the externalization of knowledge) into virtual and physical objects accommodates this way of thinking. Dealing with virtual and physical objects such as files on a computer desktop or documents on a table effectively increases a human's ability to deal with complex sense-making tasks. A standardized IO size and layout is convenient to collect, compare, and organize IOs 320. Configurations disclosed herein are based in part on the observation that the benefits of standardized information objects are present in various everyday objects. For example, index cards, credit cards, business cards, slides, photographs and postcards are usually of equal size and layout so they can conveniently be stored, accessed, and processed. The abstract representation of data, information and knowledge with IOs 320 engages a human's visual recognition in ways that decreases information access time and allows for the processing of large amounts of information. Furthermore, the process of creating IOs 320 requires users to circumscribe the contents associated with IOs 320 in a visually and mentally fast accessible and easily comprehensible format thus encouraging a more careful analysis and understanding of the contents associated with IOs. The concept and use of abstract visual and textual reminders is also present in various everyday objects. For example, desktop icons and thumbnail views allow users to easily locate and organize computer files. Military ribbons use abstract visual representations to provide service, mission and award specific information on a small clothing area. Traffic signs depend on abstract visual representations that are easy to spot and understand by pedestrians and car drivers.

In one configuration, an IO 320 does not include information per se but only serves as a reminder for the presence of a particular piece of data, information or knowledge. The separation between IOs 320 and content associated with IOs 320 allows for the compact visualization and organization of large amounts of information. AN IO 320 may be viewed as a meaningfully labeled hyperlink to a piece of content available in a remote location. Users 108 can easily arrange and rearrange IOs 320 in the workspace 300. Users 108 benefit from this process by developing a good understanding of the IO contents and the relations among IOs 320 (e.g., context). The use of IO arrangements also benefits collaborative sense-making tasks. People of different backgrounds, interests and foci have their unique ways of relating information. The collaborative development of IO arrangements can help people to determine intersecting views as well as to develop a shared understanding of a particular information space. Information objects are thus each represented as respective IOs 320 in this configuration.

The IO attribute indicators shown in FIG. 2 can indicate an IO state that can include such things as ownership of the IO, a geographic location associated with the IO, a time of creation of information associated with the IO, and other information. Depending upon the configuration, each IO 320 can further include features such as an instant messaging capability allowing to users in a distributed system to share access to an IO in order to exchange comments or messages between themselves concerning information associated with the IO. In one configuration, the system displays, within the IO perimeter, at least one messaging icon operable by a user to send a message to an IO associated with at least one other user, thus enabling collaboration. In one configuration, clicking on the messaging icon allows users to add a time/author stamped message to an IO 320 that all users 108-2 through 108-N can see if they have a copy of this IO 320. For any user 108, the icon lights red if the IO 320 includes new messages that the user has not yet looked at, green if it includes messages that the user previously looked at, and gray if the IO includes no messages. The counter next to the icon displays the number of messages. It is to be understood a that reference to an IO 320 refers to an implementation of an information object, and as will be explained shortly, algorithms disclosed herein can analyze information about IOs, such as spatial relationships between IOs, and that such algorithms and processing can be applied to other representations of information objects besides IOs, such as desktop icons, physical locations of physical items such as items on a store shelf, and so forth.

Returning attention back to the graphical user interface 132 in FIG. 1, the Workspace View 300 presents users with an empty canvas for the creation and grouping of IOs 320. In one configuration, the Workspace View 300 can be the desktop of a computer system 110 provided by an operating system, such as the Windows Desktop provided by the Windows family of operating systems made by Microsoft Corporation of Redmond Wash., USA (Windows is a registered trademark of Microsoft Corporation). The Workspace View 300 is designed to support individual and collaborative sense-making tasks such as information analysis, planning, decision-making, brainstorming, and problem-solving. The Workspace View 300 functionality will provide users 108 with the means to efficiently create, collect, organize, analyze, and discuss information. In one configuration, IOs 320 may be created manually or semi-automatically. The manual creation of IOs 320 requires the user 108 to position an empty IO 320 on the Workspace View 300 and complement it with a picture, a heading, and a reference to an information source by simply dragging and dropping pictures, texts, hyperlinks, files, or file folders onto IOs 320. The semi-automatic creation of IOs 320 allows users to drag and drop pictures, text, hyperlinks, URLs, files, and file folders directly onto the Workspace View 300. This action will cause the workspace server 151 to create a new IO 320 with the content of the dropped item linked or attached to the IO 320 and with a picture and a heading added to an icon area and the heading bar (to be explained) of the IO 320. Furthermore, users will be able to create cards (IOs) from within various computer applications (after installing a plugin) by clicking a bottom. Users 108 may also copy IOs 320 from the News View 305, the database view 310 or the exchange view 315. Furthermore, a user 108 can copy IOs 320 from the Workspace View 300 to the computer desktop or file system (and vice versa) thus converting IOs 320 into regular computer files. This functionality has a variety of applications such as to exchange IOs 320 by email or to convert IOs 320 for use with other software applications. Automated IO creation is provided as well that allows a user for example to specify a file system or path or URL or database identity and the system can traverse records, documents, web pages, files and the like within the specified path, database or domain and can convert each record, file or page into an IO for use in the system.

Below are steps a user 108 can perform to create a card. The relation manager 150 creates and displays a new card in the workspace view. The user 108 may have performed a drag and drop of some content onto the workspace view 300, or may have selected a pull down menu in the workspace view to create a new card 320. In response, the relation manager 150 creates a new card record 160 in the database to correspond to the new card in the workspace view 300. The relation manager 150 associates an information source identified by the first user to the new card 320 created in the workspace view. In the case of a drag and drop, the information source can be identified via the information dragged into the workspace view 300. If the user created a new card from pull down menu selection, the workspace view 300 can prompt the user to specify a specific information source (that can be hyperlinked or embedded) such as a file system path and filename, a URL or some other indicator. The relation manager 150 stores card attributes and an identity of the information source in the new card record 160 in the card database. The relation manager 150 stores a card creation time in the new card record. The relation manager 150 stores a card position in the new card record 160. The card position indicates positional information such as a corner pixel location (or a hierarchical location such as a specific window, directory, or desktop) as well as a window size of the new card 320 within the workspace view 300 of the first user 108. The relation manager 150 stores an identity of the first user in the new card record 160. The user for a new card becomes the author of that card 320. Once a card 320 is created, pictures and text can be dragged and dropped onto the icon area and text can be dragged and dropped on the heading bar of the card to cause those areas to automatically change. In this manner, a user 108 can create a card by simply dragging a hyperlink or file or other digital material onto the workspace view 300. A new card 320 is created where the hyperlink or file is dropped, a picture is added automatically (by searching the hyperlink destination or the file contents for an appropriate graphic), the heading is added automatically (usually the web site or file name), and a link or embedded attachment is automatically created from the file or the web site reference by the hyperlink.

In one embodiment the relation manager 150 allows a user to easily arrange, compare, and evaluate IOs 320 thus ensuring that users 108 will not be distracted by different information formats but focus on information contents. Each individual user 108 can determine the particular arrangement or spatial (vertical, horizontal, overlapping, proximal) layout of the graphical IOs 108 on his or her Workspace View that might indicate meaning to that user 108. For example, a user 108 may group IOs that represent related information sources in a relatively close proximity to one another thus defining tight spatial relationships between those IOs.

The system is able to analyze spatial relationships that exist between IOs 320 in each users Workspace View 300 in order to identify other information objects (e.g., other IOs 320) that may be of interest to that user 108. Based on this analysis, the relation manager 150 can identify other information sources by showing other IOs 320 that might be of interest to that user. Embodiments disclosed herein are based in part on the observation that the spatial arrangement of a first set of objects such as IOs 320 in the Workspace View 300 can be used to identify relationships between those objects and can be further used to identify other objects (such as other IOs) that may be of importance to a user who created the initial spatial relation between the first set of objects in the Workspace View 300.

The Workspace View 300 introduces several options for the grouping of IOs 320. One option is to increase the size of one IO 320 so as to accommodate several other IOs 320 inside its boundaries. Moving an IO 320 will drag along all IOs 320 within its boundaries. A second option is to overlap IOs 320. Moving an IO 320 inside a cluster of overlapping IOs 320 will drag along the entire cluster of IOs 320. A third option is to use multiple workspaces for the grouping of IOs 320. A fourth option is to link IOs 320 to an entire IO arrangement. A mouse-click onto such an IO 320 will then open another Workspace View 300 and display the IO arrangement. Further details on contents and layout of IOs 320 will be explained shortly.

The news server 152 produces (i.e. provides information feeds for) the News View 305 to allow users 108 to collect IOs 320 for addition to the Workspace View 300. IOs 320 in the News View 305 represent information from a variety of other information sources. Feed examples includes news, alerts, announcements, motion detections on security cameras, emails, IMs, SMSs, sensors, real time search results, and custom content. An analogy of the News View 305 is a "news stand" in which recent or periodic information is available. In one configuration, the News View 305 displays the contents IOs 320 from news servers 151 that may be distributed through the network 101 within one of more computer systems 110. IOs 320 in the News View 305 can be organized by time and information sources (e.g., by topic or content area) as well as by geographic locations associated with the information represented by each IO 320, and can be filtered for user specific keywords. Users 108 are able to copy IOs 320 between the Workspace View 300 and the News Views 305. IOs 320 copied from the News View 305 to the Workspace View 300 may be static and not change in content, or such IOs 320 may dynamically adapt to modifications in content so that as the information source associated with an IO 320 produces new information.

In one configuration, the system can display IOs in various arrangements within the News View 305. In particular, the News View 305 can display a timeline arrangement of IOs 320. The timeline arrangement provides a visualization that represents and organizes knowledge using a grid comprising of a timeline categorization for IOs on the horizontal axis and subject categorization on the vertical axis. In an alternative configuration, the new server 152 can display a map arrangement that provides a visualization that represents and organizes knowledge using a world-map or a floor plan comprising of geographical categorization for IOs. As an example, a News View can organize and arrange IOs in an ordered list or as a table with rows and columns of IOs organized horizontally by time and vertically by information sources. In such a configuration, new IOs for newly discovered information can be inserted on the left pushing existing IOs to the right. The time scale can be irregular and optimized to display the largest number of IOs possible. The rows of IOs in the News View can automatically expand and contract depending on the number of IOs to be shown in each row.

In this manner, the system disclosed herein provides a novel process for information retrieval and processing based on information collection support. In one example, the News View 305 displays incoming information in IOs 320 from user selected information sources. The users 108 can copy relevant information from the News View 305 to the Workspace View 300 or can create new information directly in the Workspace View 300 by creating new IOs. The user(s) 108 can study, organize, and categorize the information on the Workspace View 300. In one configuration, if the Workspace View is connected to a server then all content and established relations are made accessible to this server. The user can use two Workspace Views if he wishes to separate between information that is public and private. Other users 108 view the information on the news, database or exchange views 395, 310 and 315 and can also copy relevant information from the news, database, and exchange views 305, 310, and 315 to their personal Workspace Views 300. The system can track and analyze this movement of information from source to destination and can use this IO usage and movement data based on user identifiers, locations of IOs, arrangements of IOs, contents of IOs, times of movement and copying, and other such information in processing algorithms to infer or identify relationships between IOs and to suggest other IOs that reference other information that may be of interest to a user.

The News View 305 provides users 108 with the technology to effectively monitor and visualize additions and modifications from information sources such as web sites, databases, security cameras, alarm systems, sensors, news feeds and so forth. Every information item is displayed as an IO 320. In one configuration, the News View 305 can organize and arrange IOs 320 in an ordered list or as a table with rows and columns of IOs 320 organized horizontally by time and vertically by information sources, such as by geographic origination or relation of the new story associated with the IO 320. In another configuration, the News View has several visualization options such as displaying the IO arrangement in a table or displaying the IO arrangement on a geographic map. In one configuration, new IOs 320 for newly discovered information can be inserted on the left in an appropriate row pushing existing IOs 320 to the right. The time scale can be irregular and optimized to display the largest number of IOs 320 possible. The rows of IOs 320 in the News View 305 can automatically expand and contract depending on the number of IOs 320 to be shown. The News View 305 can include an adaptor for receiving news feeds and the user interface chronologically organizes information chronologically in a subject-time matrix. The News View 305 row can combine multiple data streams so that a row includes a group of data streams. A News View row can also display other data formats as well (email, search results, sensor data gathered though a file transfer protocol (FTP) in addition to displaying RSS streams.

Figure 9:
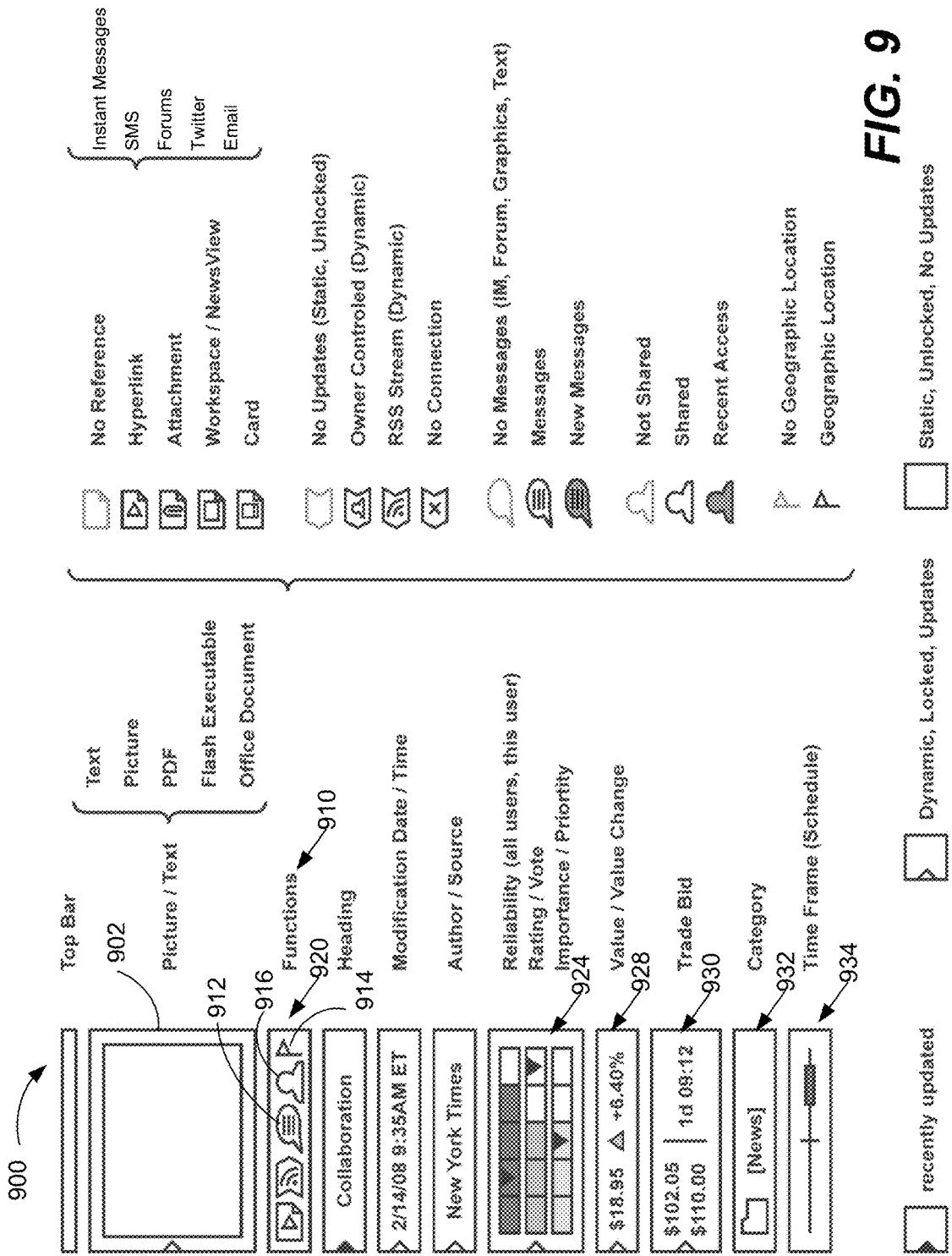
FIG. 9 is a diagram of IO components in accordance with one example embodiment disclosed herein.

The News View 305 offers a variety of tools for the exploration and collaborative use of information. As an example, a user 108 can copy IOs 320 from the News View 305 to the Workspace View 300 thus allowing users to easily collect, compare and organize new information. IOs 320 copied from the News View 305 to the Workspace View 300 may be static or dynamic as noted above. A static IO 320 is an exact copy of the IO on the News View 305. In one configuration, a dynamic IO 320 continuously updates itself to reflect the most recent (left-most) IO on the News View row it was copied from. FIG. 9 below shows another example layout and additional IO features.

In this manner, the system disclosed herein provides a novel process for exchanging information and for asynchronous, decentralized, remote, and cross-organizational collaboration. In particular, users 108 use their individual Workspace Views 300 to organize and analyze information. The exchange server 153 produces the exchange view 315 to display cards (IOs) 320 that are concurrently displayed in one or more workspace views 300 of at least one other user 108. The exchange view 315 can display cards (IOs) 320 in prioritized order, or alternatively can display cards 320 the way they are arranged on another users Workspace. This allows users 108 to view each other's Workspaces 300 as they appear to those other users 108. The exchange view 315 displays (in prioritized or chronological order in one configuration) the IOs 320 created by all collaborating users 108 (or those with the appropriate access permissions or security levels). The exchange server 153 manages the display and exchange of card (IO) information between exchange views 315 and can include filter features to allow a user 108 to only see cards (IOs) from selected users 108 (as opposed to all cards (IOs) in all workspaces 300 of all users 108). The users 108 can copy relevant IOs 320 from their exchange views 315 to their Workspace Views 300. Users 108 can take "ownership" over IOs 320 copied from their exchange views 315 and these IOs 320 are now modifiable by the user 108. In one configuration, when a user takes ownership of an IO 320, the IO 320 is no longer synchronized with a counterpart IO on the IO author's Workspace View. In another configuration, once an IO 320 is owned exclusively by a user 108, these IOs 320 can no longer be used for collaboration such as by "instant messaging," IO commenting, or "IO voting."

Figure 3:
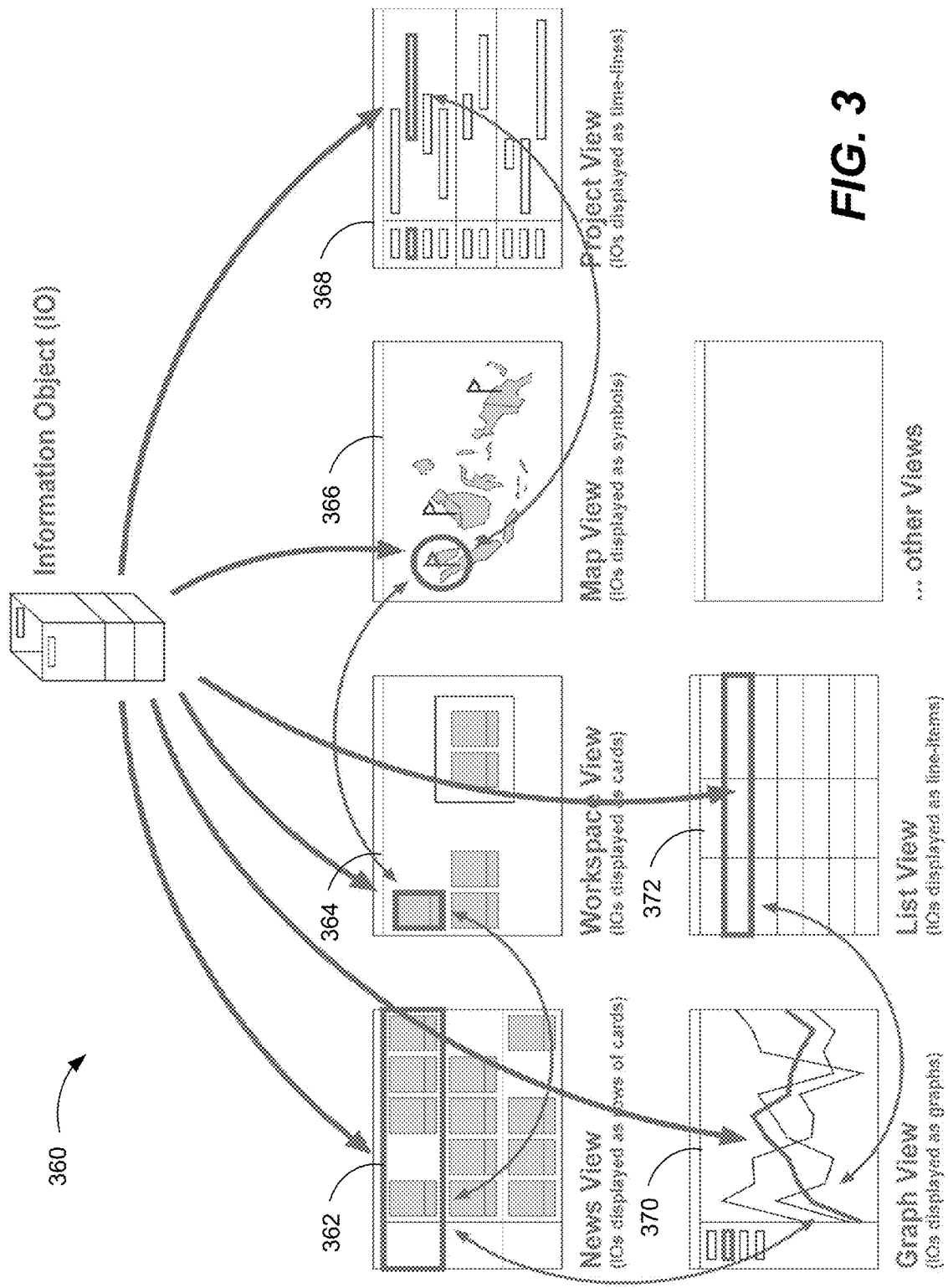
FIG. 3 is a diagram of information flow and IOs present themselves differently on different IVs and can be copied between IVs in accordance with one example embodiment disclosed herein.

FIG. 3 show a diagram 360 of an IO 320 as viewed in several IVs. The diagram 360 also shows how IOs present themselves differently on different IVs and can be copied between IVs. The following are examples of the various IVs (not intended to be limiting). The News View 362 displays the contents of RSS streams (and other dynamic information sources) as IOs arranged in a table, organized by time in horizontal and by information sources, subject or category in vertical direction. New IOs are inserted on the left pushing existing IOs to the right. The time scale is irregular and optimized to display the largest number of Ms possible (meaning time segments without IOs are automatically removed). The rows automatically expand and contract depending on the number of news items (makes all rows display similar numbers of IOs). Users can add RSS files by simply dropping an IO or an RSS URL onto a row in News View. A News View row can include multiple RSS streams (multiple streams are automatically combined). The News View can be used to display a wide variety of information such as newspaper news, emails instant messages, motion activity on web cameras, eBay and Craigslist postings, company internal announcements and alerts. The News View can also be used as a RSS feed generator. For example, a user could create an empty News View that all users can view and add IOs to. Users can copy News View rows or individual IOs to other IVs. A copy of a News View row onto a Workspace View would result in a single IO that dynamically updates itself and that displays the most recent item in the associated RSS feeds. The primary purpose of the News View is to help users monitor large numbers of RSS feeds in a quick and easy comprehensible format.

The Workspace View 364 displays IOs in a game IO like format. The visual components of the IOs are customizable and expandable. Users can modify IO parameters in a so-called IO editor (see Illustration 3 and 4). For example, users can add files to IOs, view and modify ratings, or discuss the IO contents with other users through the built-in instant messaging system or shared white board. If a user moves a regular file or a URL from a computer file system or a web browser onto the Workspace View then an IO is automatically created with the file attached or the URL hyperlinked. The Workspace View is designed to allow users to easily collect, organize and compare information in different formats and locations. For example, a Workspace View may be used for web shopping allowing users to quickly drag and drop items of interest from different web sites (such as Amazon, eBay, and Craigslist) onto the Workspace View for the subsequent comparison of options and prices. Since IO components can be dynamic (meaning that they can automatically retrieve content updates from dynamic information sources) the user can also use a collection of IOs to monitor changes to prices and bids.

The Map View 366 is a geographic map display that represents IOs as location items. A location item presents itself as (one or more) symbols (of choice) on the map. The location item allows access to all IO functionality available in other IVs. If the geographic location associated with a location item is dynamic then the symbol would automatically update its location on the map. If a location item is copied to a Workspace View then it will present itself as an IO with the geographic location accessible and modifiable through the IO Editor. The Map View is primarily designed for military use but has a wide range of commercial applications as well. For example, a user could create a public Map View with hiking paths. Other users could copy hiking paths of interest from this public Map View to their personal Map View s or other IVs, discuss hiking paths through the IO instant messaging feature, or rate the quality of hiking paths through the IO rating system.

The Project View 368 is a time planning and calendar display (similar to MS Project) that allows users to represent IOs as time bars. IOs in this IV also maintain all the contents and functionalities of IOs displayed on other IVs. Moving an IO from the Project View to the Workspace View would create an IO that displays the time frame with a time bar on the IO or a time frame in the calendar tool of the IO Editor. The Project View is primarily designed for people that need to compare and modify time related IO parameters. For example, the Project View may be used to review and modify IOs that represent tasks scheduled for execution during particular time frames, resources that are only available during particular time frames or people that are only available during particular time frames.

The Graph View 370 displays IOs as line or bar graphs. This particular IV is primarily designed for comparing statistical data associated with IOs such as stock quotes, bids and sensor data.

The List View 372 is a spread sheet like display (similar to the Microsoft (ID Office Excel spreadsheet program) that allows users to represent IO parameters in a table format. The List View is primarily designed for people that need to compare and modify particular IO parameters such as, for example, the cost of sales items or the specifications of resources referenced by individual IOs.

Figure 4B:
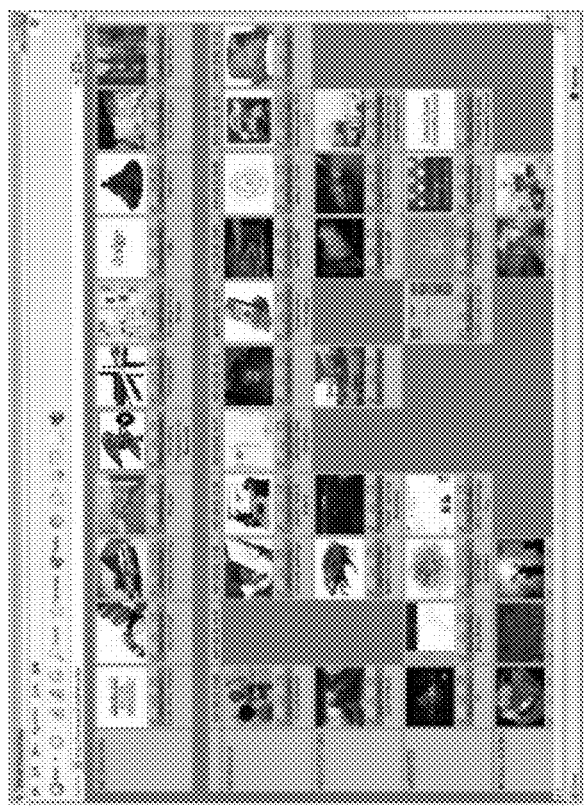
FIGS. 4A and 4B are diagrams of News Views that display news for multiple different news papers postings by different users.
Figure 4A:
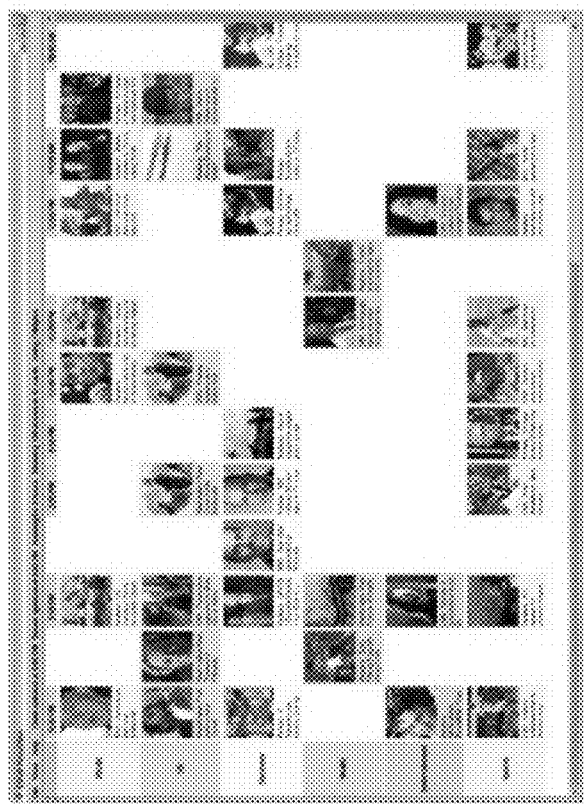

Now referring to FIGS. 4A and 4B, screen shots show News Views that display news for multiple different news papers (FIG. 4A) and postings by different users (FIG. 4B).

Figure 5A:
FIG. 5A is a diagram of IOs being exchanged between IVs of different users.
Figure 5B:
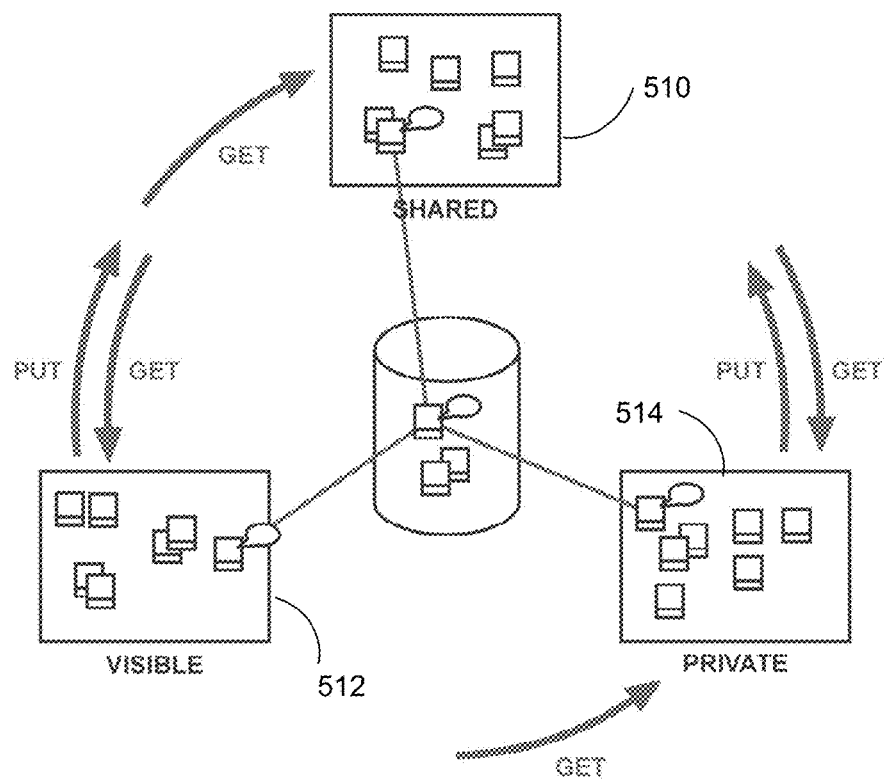
FIG. 5B is a diagram of IOs being exchanged between Private, Visible and Shared Views.

FIG. 5A shows a diagram of IOs being exchanged between IVs of different users. FIG. 5B shows a diagram of IOs being exchanged between Private, Visible and Shared Views. There are various ways in which IOs can be exchanged between the IVs of the same and of different users such as:

by copying IOs from the personal IV of another user (Users can make their personal IVs accessible to other users. An IV can be Shared 510 (read/write), Visible 512 (read) or Private 514;

by sending IOs to a particular user or group of users through the integrated instant messaging system or a commercial instant messaging system;

by sending IOs to a particular user or group of users through email;

by making IOs available through shared file systems; and by retrieving IOs from our database (The database automatically collects and organizes IOs from the IVs of different users.

A variety of data visualization and access tools allow for the easy retrieval of IOs from the database, for example, in conjunction with an EWall Agent System; and by retrieving IOs from a Discovery View. The Discovery View presents individual users with a custom selection of potentially relevant IOs, and in one embodiment consolidates the Exchange View (315) and Database View (310). In this embodiment, the Discovery View not only displays related information in the IO database 125 but can also display related information found by other web services (e.g., related products for one selected product provided by online sellers or search engines). The Database Views (Discovery Views) 310 of individual users 108 display (in prioritized order) cards (IOs) 320 available in the database (as records 160) that are related or relevant to the cards (IOs) 320 on a user's workspace view 300 based on the relations discovered via application of the relation processing algorithms 155.

The relation manager 150 is able to analyze the spatial arrangement of the cards 320 as provided by the user 108 in the workspace view 300 in order to deduce or infer relations between the information sources associated with the cards 320. In response, the database server 154 can provides other cards based on matching card records 160 maintained in the card database 125 that may be of interest to that user based on the analysis of the spatial arrangement of the cards 320 on that user's workspace view 300. The database server 154 is thus capable of inventing or deriving additional relations 170 based on the analysis of previous relations. For example if card A is related to card B and card B is related to card C, then the database server 154 can decide to relate card A and C because the indirect relation suggests a partial correlation. In this manner, the system disclosed herein provides a novel process for organizational knowledge management based on information merging. Users 108 use their individual workspace views 300 (or operating system desktops and file systems) to organize and analyze information. Additions to the workspace views of all users are collected in the card database 125. The database items including the relations 170 and the card records 160 are combined into one coherent network of cards using the relation processing algorithms 155. The number of relations 170 between individual cards 320 may differ and can indicate the "strength" or "importance" of a relation 170 (or its unimportance or weakness). Relations 170 in the database 125 may be complementary or conflicting, speculative or concrete. The database views 310 of individual users 108 display (in prioritized order) cards 320 available in the database (as records 160) that are related or relevant to the cards 320 on a user's workspace view 300 based on the relations discovered via application of the relation processing algorithms 155.

The activities and contents on the individual users Workspace Views are monitored and recorded by the Recognition Functions. The Recognition Functions maintain a record of all active and erased cards including a list of all current and past owners and users of individual cards. The Recognition Functions record and combine all explicit relations among cards established by the users as well as all implicit relations established by the Algorithms. The Recognition Functions keep track of all interactions that take place among users. An interaction is registered if a user copies a card, views the content associated with a card, or adds a comment, vote or notification to a card.

The relation manager 150 analyzes card (IO) records 160 and card relations 170 within the card (IO) database 125. The results of this analysis can produce an indication of other card records 160 in the card database 125 that correspond to other cards 320 that are not currently displayed in the workspace view 300 of the user 108, but that might be of interest to that user operating that workspace view 300. A transformation algorithm 155 that can, for example, compare the combination of spatial relationships 170 that identify closely placed cards 320 in the workspace view 300. For those cards 320 that are close to each other, the transformation algorithm 155 can compare the content of those cards (i.e., can compare the information sources referenced by these cards) to identify a common subject. Alternatively, the transformation algorithm 155 can compare the creation time of closely spaced cards. In another alternative, the transformation algorithm 155 can compare user identities of users 108 who have accessed these cards. Using these metrics (e.g. a common creation time window, or a common subject, common users or use patterns), the transformation algorithm 155 can identify, in order of relevance, a set of resultant cards not already placed in that user's workspace 300. These can be shown to the user in the database view 310. Additionally, the current arrangement of exchange view cards 320 can be reordered to reflect the newly discovered relations of the group of cards so that cards of other users that might be of importance to the user (that are already in the exchange view) are more to the front of the line or list in the exchange view to be more noticeable to that user. In one configuration, cards 320 displayed on views not only hint relevant information but also inform about people (the authors of the cards) with relevant knowledge on a particular topic. This can foster the creation of teams or communities of interest and help to build knowledge-based relationships between people due to information objects those people spatially organize in particular ways.

The relation manager 150 applies at least one interpretation algorithm 155 between card (IO) records 160 in the card database 125 to create relations 170 between card records 160 in the card database 125. The relation manager 150 applies a spatial relation algorithm 155 that discovers spatial relations 170 between position information of at least two card records 160 in the card database 125 that are associated with cards 320 displayed on the graphical user interface 132 in the first set of cards. The relation manager 150 identifies implicit relations between cards in the first set of cards displayed on the graphical user interface based on proximity of cards on the graphical user interface. Thus, how close or far apart cards are can determine a strength or week relationship between cards 320. The relation manager 150 identifies implicit relations between cards in the first set of cards displayed on the graphical user interface based on horizontal alignment of cards 320 on the graphical user interface 132. Horizontal alignment can be suggestive of a list of items and transformation algorithms 155 can perform analysis of cards 320 arranged horizontally to suggest other cards that might be successor cards in the list. The relation manager 150 identifying implicit relations between cards in the first set of cards displayed on the graphical user interface based on vertical alignment of cards on the graphical user interface. Likewise, vertical arrangements of cards 320 might also be suggestive of a card list. The relation manager 150 identifying implicit relations between cards in the first set of cards displayed on the graphical user interface based on at least some overlap of cards on the graphical user interface. Overlapping cards can suggest a grouping relationship. It is to be understood that the spatial relations noted above are not limited to vertical, horizontal and overlap. Other spatial relations can exist and be analyzed as well, such as relative size relations between cards, or exclusive (i.e. alone) or particular placement (e.g. in a certain corner, in center, etc.) of cards 320 in certain regions within the graphical user interface 132. Additionally, spatial processing algorithms can recognize card clusters that define groups of cards in close proximity to one another that create a cluster that is distinct from other clusters of other cards 320. The relation manager can detect and analyze other relations as well besides spatial relations. As an example, context relations concerning use, access (e.g. copying) or other operations on cards can be detected that are based on time of card creation or modification, which users access a card, and relation of content between cards that have similar or relating subject matter. The relation manager 150 applies at least one context relation interpretation algorithm 155 to discover contextual relations between card records 160 in the card database 125. The contextual relations 155 indicate commonality between at least two card records 160 based one or more relationship criteria. In one configuration, the relation manager 150 can detect and analyze chronological context of the at least two card records (e.g., sequence of creation or modification of card information). In another configuration, the relation manager 150 can detect and analyze collaborative context by at least two users 108 of at least two cards 320 respectively associated with the card records 160. An example of collaborative context is when two or more users share two (or more) cards such as by providing comments to those cards, or using instant messaging to discuss information associated with the cards, or via other common access (e.g., copying to workspace) to the cards by those two or more users. In another configuration, the relation manager 150 can detect and analyze similarities of content identified by the at least two card records using keyword or subject or title matching, for example. In this manner, using contextual relations, the relation manager 150 can determine, for example, that if user A and B use the same card then other cards used by user A and B are more likely to become related. Card content can include content displayed on the card, parameters associated with the card, or information content hyperlinked to the card or metadata about the card (e.g., creation time, time of last access, time of last copy, user access history, etc.) that might not be readily visible from viewing the cards in a view. In one configuration, the database contents are evaluated based on the relations between cards. The relation manager 150 can thus establish relationships among cards 320 based on comparison of content and spatial history of card usage. Content relations are established based on a comparison of card contents such as headings, contents of hyperlinked files, and image descriptions, whereas context relations are established based on the spatial location of cards, the collaborative use of cards, or the virtual organization of cards (e.g. the hierarchical organization of files in computer directories). For example, two relations between two cards can be valued more than one relation between two cards. This is because two relations between two cards means that two different algorithms both established a relation between these two cards, although such relations may have been established for different reasons.

Four distinct types of Database Algorithms examine the networked contents of databases by defining a starting point, a search path, an end point, and the order in which the search results are returned: The first type of Database Algorithms defines the Start Point of a database search. The Start Point refers to a node (IO) in a database from where directly and indirectly related information is being retrieved. A Start Point may be defined though a conventional database query that contains text or graphical information. This means that a Start Point might reflect a node that contains similarities with information that a particular user is currently working with, focusing on, or searching for. A Start Point can also be the most recently active node in the database such as the most recently added, retrieved, traversed, or modified node.

Furthermore, a Start Point might be defined through so-called "Stimuli" or "Focal Points" that are placed and dynamically displaced by the Database Algorithms. The Start Point continuously changes its location and multiple Start Points may exist simultaneously. In the case of multiple Start Points the search progresses in parallel from multiple locations and in multiple directions. Every search returns the node referenced by the Start Point as well as a selection of directly and indirectly connected nodes. The selection of related nodes is defined by the Search Path. By default, the second node returned is the adjacent node with the most relations. The same procedure applies for all subsequent nodes unless specified differently by the Search Path. The second type of Database Algorithms defines the Search Path. The search path determines how the network is traversed. Every search initiates at a Start Point and proceeds by examining adjacent nodes. By default, adjacent nodes with many relations are examined first. Previously examined nodes are ignored. The Database Algorithms offer a variety of options for the examination of less heavily connected nodes. For example, the Curiosity Algorithm is used to increase the probability for the examination of weaker branches. In addition, the Persistence Algorithm determines how many nodes associated with weaker branches will be considered. Other Database Algorithms dynamically define and modify the Search Path based on the relevance of currently explored nodes. The relevance of nodes is determined based on the card contents or the card authors. For example, a card may not contain relevant content but its author may be known for having created cards that contain relevant content. Thus, the author is considered a specialist in this particular area and the cards created by the author are given preference. The third type of Database Algorithms defines the End Point of a Search Path. The End Point may be determined through an analysis of the card contents, the distance from the Start Point, or the time passed since the start of an examination. In other words, the End Point represents either a satisfying search result or a state of decreasing patience or tiredness. For example, the Patience Algorithm terminates a search after the examination of certain number of nodes. The fourth type of Database Algorithms orders the search results. By default, the search result is a string of nodes that reflects the sequence in which the nodes were examined. Other criteria of organizing the search results include the distance of nodes from the Start Point, the number of relations associated with individual nodes, or the card properties such as card sizes, modification dates, authors, contents, notifications, comments, votes, accesses, font types, font styles, font sizes, pictures, and locations.

The Unity Algorithm sorts cards (IOs) by the number of current and past users of individual cards. A card user is defined as somebody who created, copied, took ownership, reviewed the content, commented, or voted for a particular card. The Unity Algorithm assumes that the activity associated with a card is a meaningful way to determine the importance and popularity of the card. The Weight Algorithm sorts cards by the number of relations associated with individual cards. may be related twice with card B and once with card C. Thus, card A is associated with three relations, card B with two relations, and card C with one relation. The Weight Algorithm assumes that number of links associated with a card is a meaningful way to determine the importance and popularity of the card. The Relevance Algorithm is the same as the Weight Algorithms yet only considers relations that connect with cards the user is using. For example, a card on a user's Exchange View may be related to four cards only one of which the user is using on his Workspace View. Thus, the number of associated relations for this card is assumed one rather than four. The Relevance Algorithm is particularly useful to spot cards that have some relevance with cards the user is already using. The Group Algorithm fosters the information exchange among users that have had frequent interactions in the past. The Group Algorithm considers an interaction when a user copies a card from another user, takes ownership over another user's card, or adds a comment or a vote to another user's card. The Group Algorithms orders cards based on the number of interactions that a particular user had with the individual card authors.

Figure 6A:
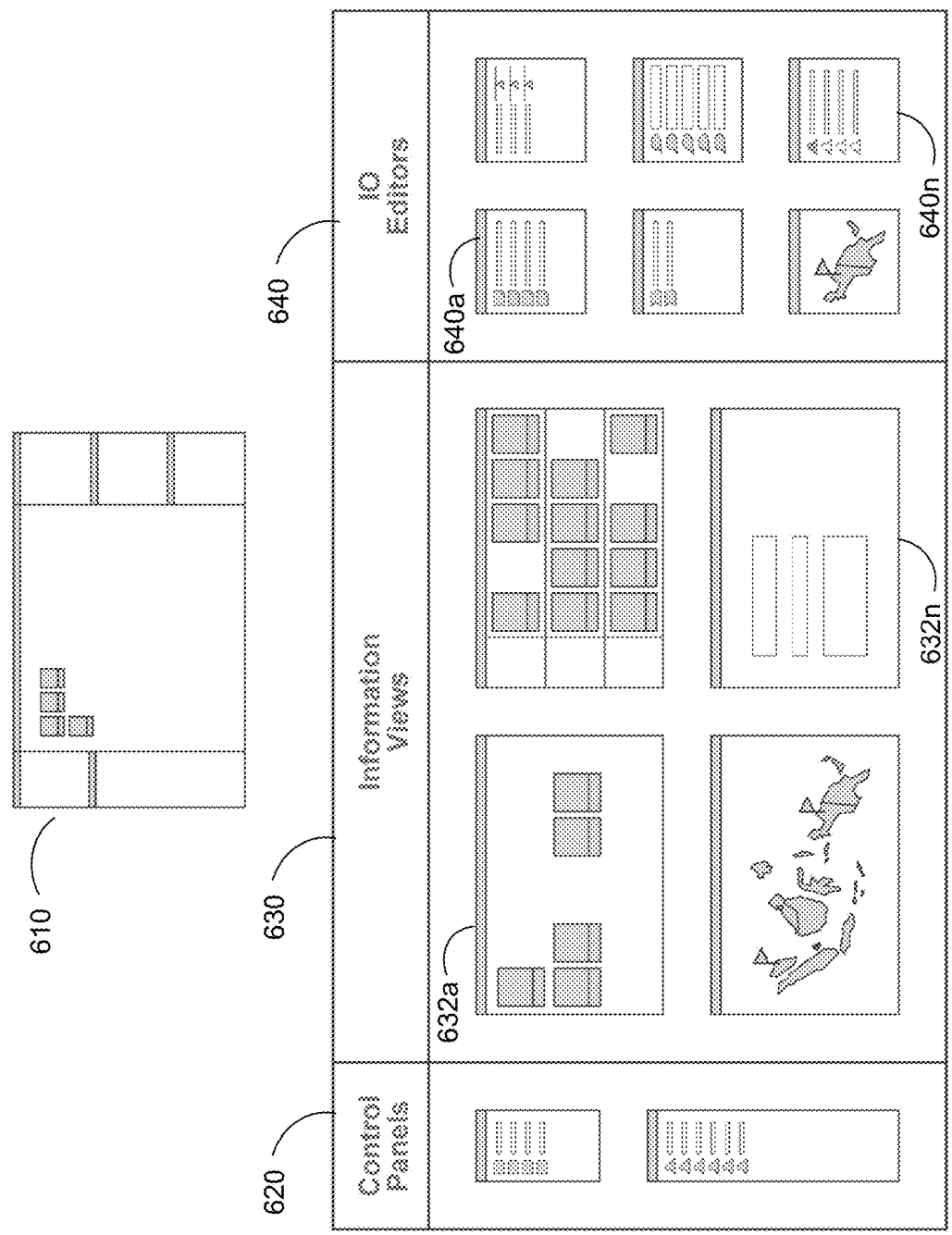
FIG. 6A is a diagram of an exemplary graphical user interface (GUI) Organization in accordance with one example embodiment disclosed herein.
Figure 6B:
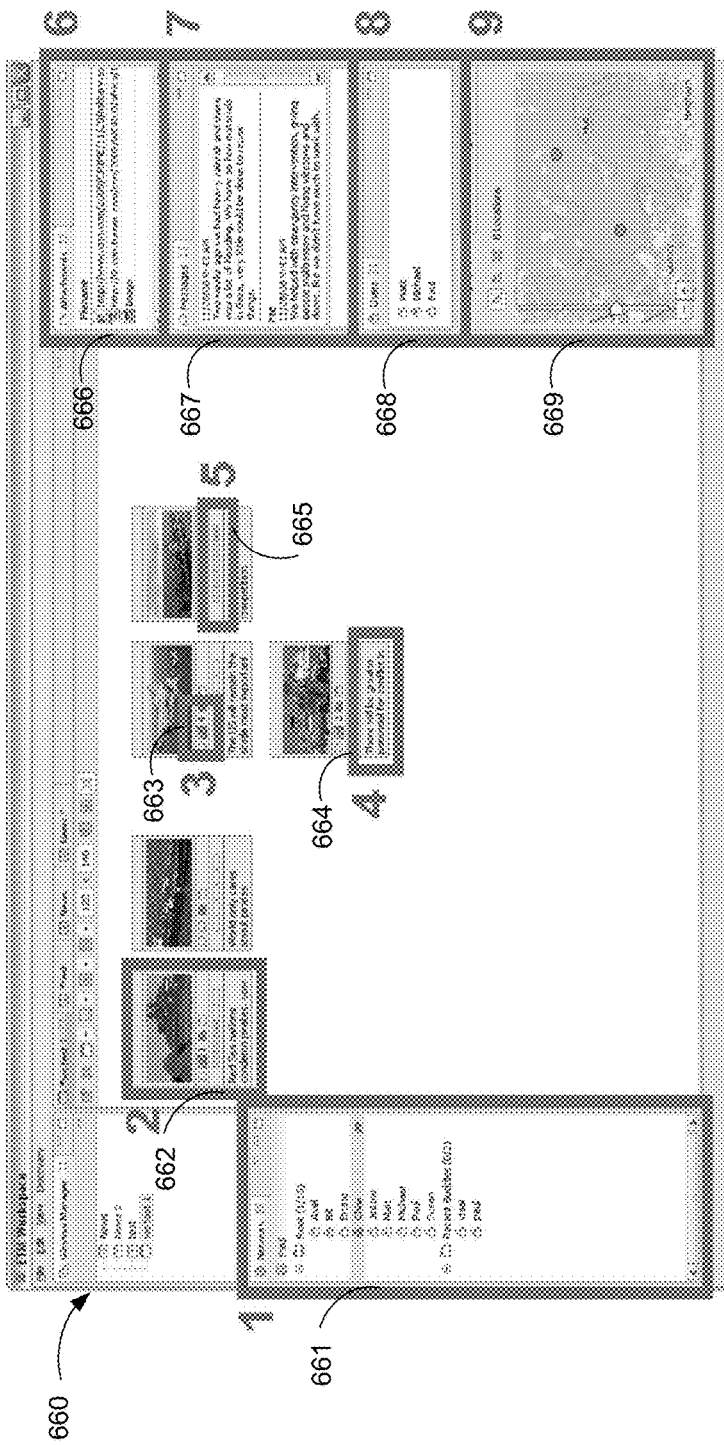
FIG. 6B is a more detailed diagram of the exemplary GUI Organization of FIG. 6A.

FIG. 6A is a diagram of an exemplary GUI Organization including graphical user interface 610 for the management of IVs in accordance with one example embodiment disclosed herein. FIG. 6B is a more detailed diagram of the exemplary GUI Organization of FIG. 6A. In one embodiment, the GUI Organization includes three columns. The left column 620 includes displays 622 and 624 provided by the View Manager 178 and the Communication Manager 180, respectively. The View Manager 178 displays all available IVs, allows users to open individual IVs, and enables users to modify the access rights of individual IVs. The View Manager 178 also displays representations of servers, databases, agent systems (e.g., EWall Agent System) and users in the collaborative environment. The Connection Manger 180 allows users to communicate with other users, exchange IOs with other users, access the IVs of other users, import IOs from databases and agent systems, as well as to control the export of IOs to databases and agent systems. The middle column 630 is used to display one or more IVs 632a-632n. The right column 640 includes the IO Editors 642a-642n. IO Editors 642a-642n are tools that allow users to view and modify IO parameters and operate IO functions. The information displayed in IO Editors always refers to the currently selected IO or group of IOs.

Figure 6C:
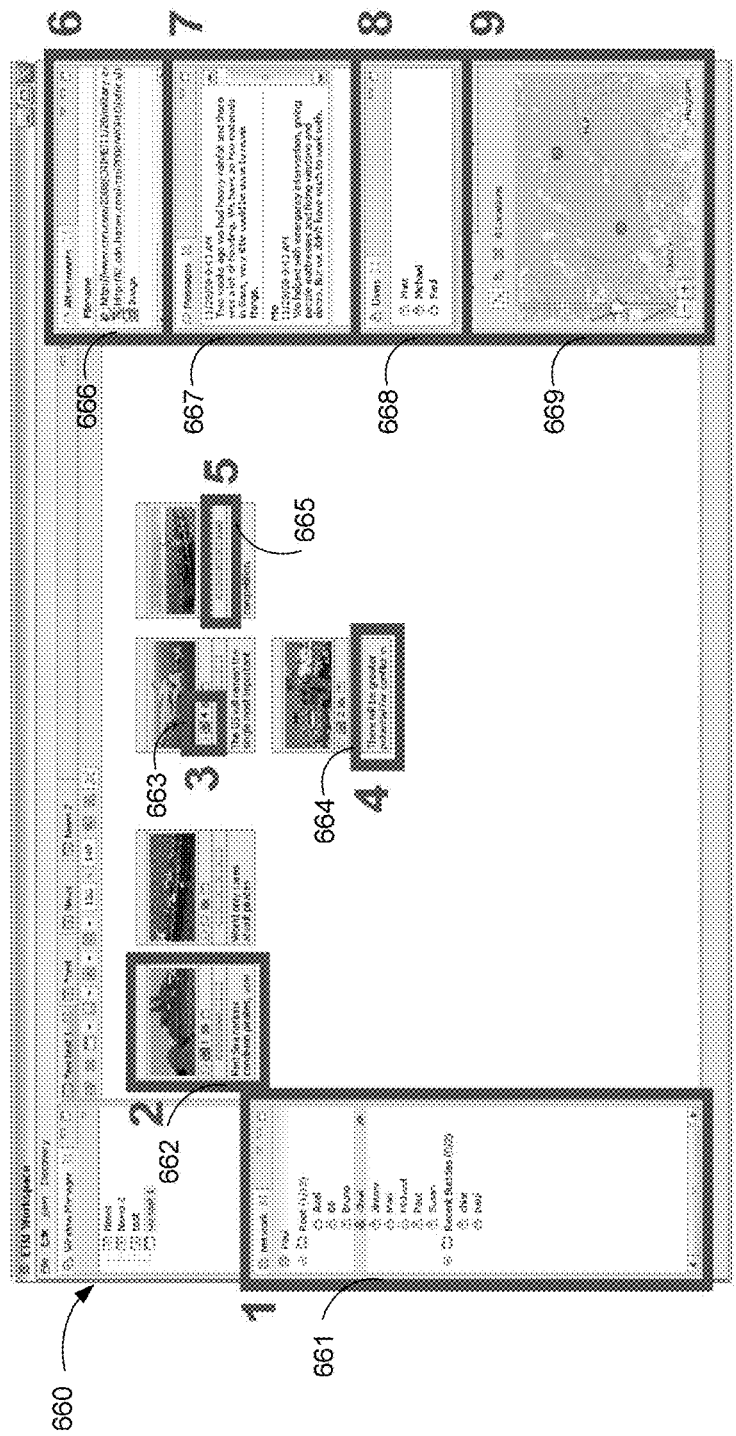
FIG. 6C is a diagram of an alternate exemplary GUI Organization in accordance with one example embodiment disclosed herein.

FIG. 6C is a diagram of an alternate exemplary GUI 660 in accordance with one example embodiment disclosed herein. Graphical user interface 660 for displaying an information objects includes a discussion subject 602, a message indicator 603, threaded discussion window 607, a list of participants linked to the information object 608, a collaborative rating 605 including a ranking of importance, a buddy list 601, a discussion heading 604, a list of attachments 606 and meta-data and shared applications 609. In other embodiments the graphical user interface for displaying information objects includes a geographic map, category keywords and auction information. In other embodiments the attachments include thumbnails of multimedia data.

Figure 7:
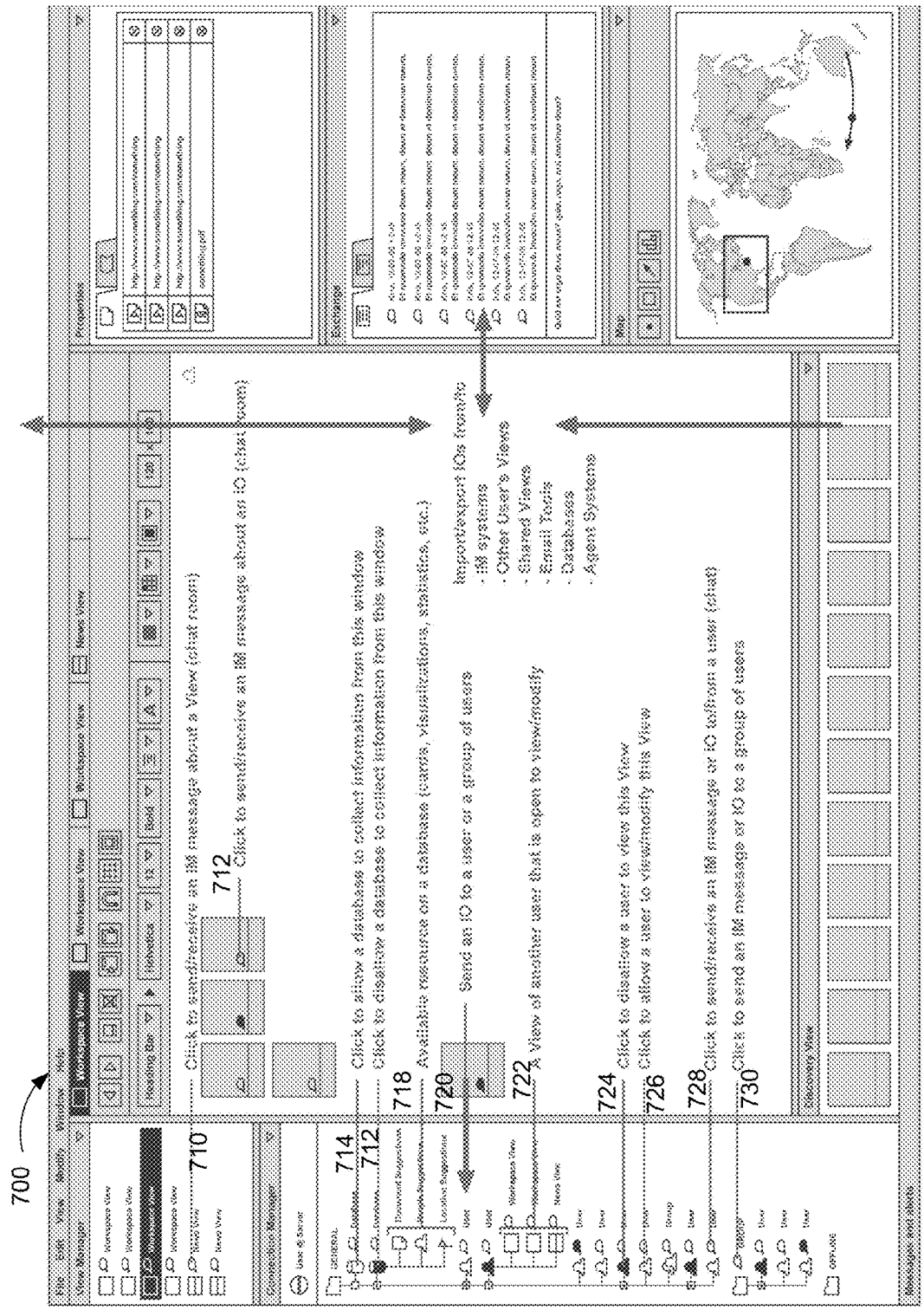
FIG. 7 is a diagram of a graphical user interface (GUI) which allows the users to select import/export IOs from/to IM systems, other users views, shared views, e-mail tools, databases, agent systems in accordance with one example embodiment disclosed herein.

FIG. 7 is a diagram of a GUI 700 showing several features of the system 110 available to the user including control 710 which when clicked sends or receives an IM message about a view. This is a means for enhancing a hosted conversation, for example in a chat room. The GUI 700 further includes control 712 click to send/receive an IM message about an IO, for example in a chat room. The following controls can also be used: control 714 allows a database to collect information from the corresponding window; control; 716 disallows a database to collect information from the corresponding window; control 720 sends an IO to a user or a group of users; control 724 disallows a user to view details of the corresponding view; control 726 allows a user to view/modify the corresponding view; control 728 sends or receives an IM message or IO to or from the user, for example in a chat room; and control 730 sends an IM message or IO to a group of users, for example in a chat room. Indicator 718 indicates available resources in a database (cards, visualizations, statistics, etc.) and indicator 722 indicates a view of another user that is open for viewing or modification. GUI 700 allows the users to import and export IOs from and to IM systems, other users views, shared views, e-mail tools, databases, agent systems.

Figure 8:
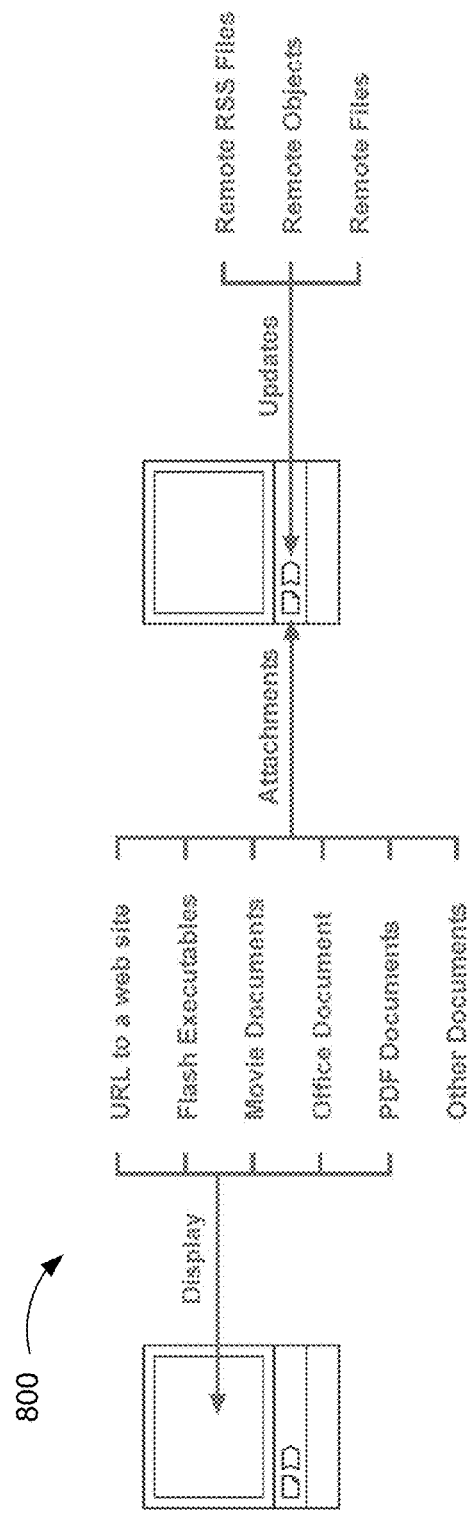
FIG. 8 is a diagram of IO File Management An IO can "display" different types of files such as pictures, text, movies, flash applications (left), attach/hyperlink different types of files (middle), and dynamically update IO contents (right). in accordance with one example embodiment disclosed herein.

FIG. 8 is a diagram of IO File Management 800 which allows an IO to display the content of different types of files 802 including such as content from: a web site 810, flash applications 812, movies 814, pictures, text from office documents 816, PDF documents 818 and other documents 820. In operation, the IO file manager 182 processes attachments, hyperlinked web content from the different file types 802 and remote sources 806 including remote RSS files 822, remote objects 824 and remote files 826 to create and dynamically update IO contents.

A user 108 can create an IO by simply dragging a hyperlink or file or other digital material onto the Workspace View 300. A new IO is created where the hyperlink or file is dropped, a picture is added automatically (by searching the hyperlink destination or the file contents for an appropriate graphic), the heading is added automatically (typically the web site or file name), and a link or embedded attachment is automatically created from the file or the web site reference by the hyperlink FIG. 9 is a diagram of IO components expanding on the basic IO components described above in FIG. 2. IOs include default and custom parameters and functions. IO parameters and functions are best explained with IOs rendered on Workspace Views. IOs can display a large number of IO parameters and function without the need for the user to access the IO Editor. The IO layout can be customized to only display the IO parameters and function the user wants to see. The following list provides a few examples of IO parameters and functions as they would appear in different sections (Bars) of an IO on a Workspace View.

Picture/Text bar 902 allows the insertion and display of text, pictures, PDF files, active Flash applications (can run inside the Picture/Text Bar), Office documents, and additional applications, file types and multi-media data. Function Bar 910 displays icons that serve as status indicators and that link to particular IO Editors.

A Bubble Icon 912 opens an IO Editor window that allows users to exchange comments, share a white board, contribute to a forum, or insert notes. The "bubble" icon 912 is rendered white if no user added any information, gray if one or more user added information and red if one or more users added information that the viewer has not yet looked at. An optional calendar tool allows users to compare their availabilities and schedule a "chat" session ahead of time.

A Flag Icon 914 links to a map display in the IO Editor allowing users to view and modify geographic locations associated with an IO. A Person Icon 916 indicates whether a particular IO is used by other users and links to an IO Editor that allows the IO owner to view the list of IO users as well as to assign access restrictions to IO contents. A File Icon 918 allows users to add and access (any number of) attachments and hyperlinks to an IO and allow for contents to be partially or fully encrypted. An Arrow Icon 920 allows users to add, modify and control dynamic information sources (e.g., to control automatic updates to IO contents retrieved from dynamic information sources such as Email accounts, RSS feeds, sensors, motion detectors and security cameras or web sites). Users can activate one or more Reliability/Ratings/Votes/Importance/Priority Bars (collectively referred to as bars 924) for the individual and collaborative evaluation of information. IOs can be evaluated on a scale from 1 to 5 (represented by 5 boxes). Filled boxes represent the average evaluations of all IO users while the arrow symbol indicates the individual rating of the IO viewer.

Trade bar 930 and Value/Value Change bar 928 comprise a trading feature that allows users to trade IO contents or items referenced by IOs. For example, an IO could represent a stock (market item) and allow users to monitor, buy and sell stocks; an item on eBay or Craigslist and allow users to monitor and manage bids; or an item on Amazon and display its current purchase price. Users associate IOs with one or more categories using a Category bar 932 that allows for faster IO searches on IVs and databases. Users associate IOs with a time or time frame using Time Frame/Schedule bar 934, for example, displayed on IOs as a point or as a bar on a time scale. The time scale is the same for all IOs and can be set in the preference menu, e.g. left side of the bar=−12 hours, middle=now, right=+12 hours. The point or bar on the time scale will move from left to right in accordance to the real time. Graphic display 940 shows various display options for icons on the various function bars.

In one embodiment the system 110 provides hosted conversation among a group of participants using the integrated instant messaging system facilities which provide a communication system linking an IO to a group of participants. Each system component (TO, IV, Database, Agent System) and participant is linked to the instant messaging system (also known as a chat room). The IO can include a link to a document, links to the group of participants, meta-data related to the conversation and communication system which links the IO to the group of participants. The process of initiating a hosted conversation begins when a user starts a discussion or a collaborative project by first creating a new IO and then adding data, meta-data and linking participants to the IO.

For example, to communicate about the contents of an IO the user would click the bubble icon 912 on this IO in the user interface on the client system to "chat" (about this IO) with other participant who maintains a copy of this IO. Clicking on the "bubble" icon 912 associated with a participants (or group of participants) listed in a contact list and linked by the connection manger 180 would initiate a "chat" session with those participants. The hosted conversation includes a list of participants linked to the at least one information object and an IV to visualize the at least on information object. Clicking on the "bubble" icon 912 associated with the IV in the View Manager would initiate a "chat" session (about this IV) with every other participant who has access to this IV. The integrated instant messaging system is also used to exchange IOs between users. An IO can simply be dragged and dropped onto a user icon which subsequently sends a copy of this IO to the intended recipient. The instant messaging functionality can be complemented with any other IO parameter and function such as, for example, a function that allows users to assign ratings to databases, agent systems, users or IVs. One important benefit of this system is that it allows users to stay engaged in a large number of discussions about particular subjects represented by different users, IOs or IVs. Advantageously the user can organize and monitor a large number of IOs where every IO represents a different issue that may be discussed with a different groups of participants.

Thus system 110 provides a graphical interface for displaying an information object which includes displaying a threaded discussion window, a list of participants linked to the information object, a collaborative rating including a ranking of importance, a buddy list, a discussion heading; and a list of attachments.

Figure 10:
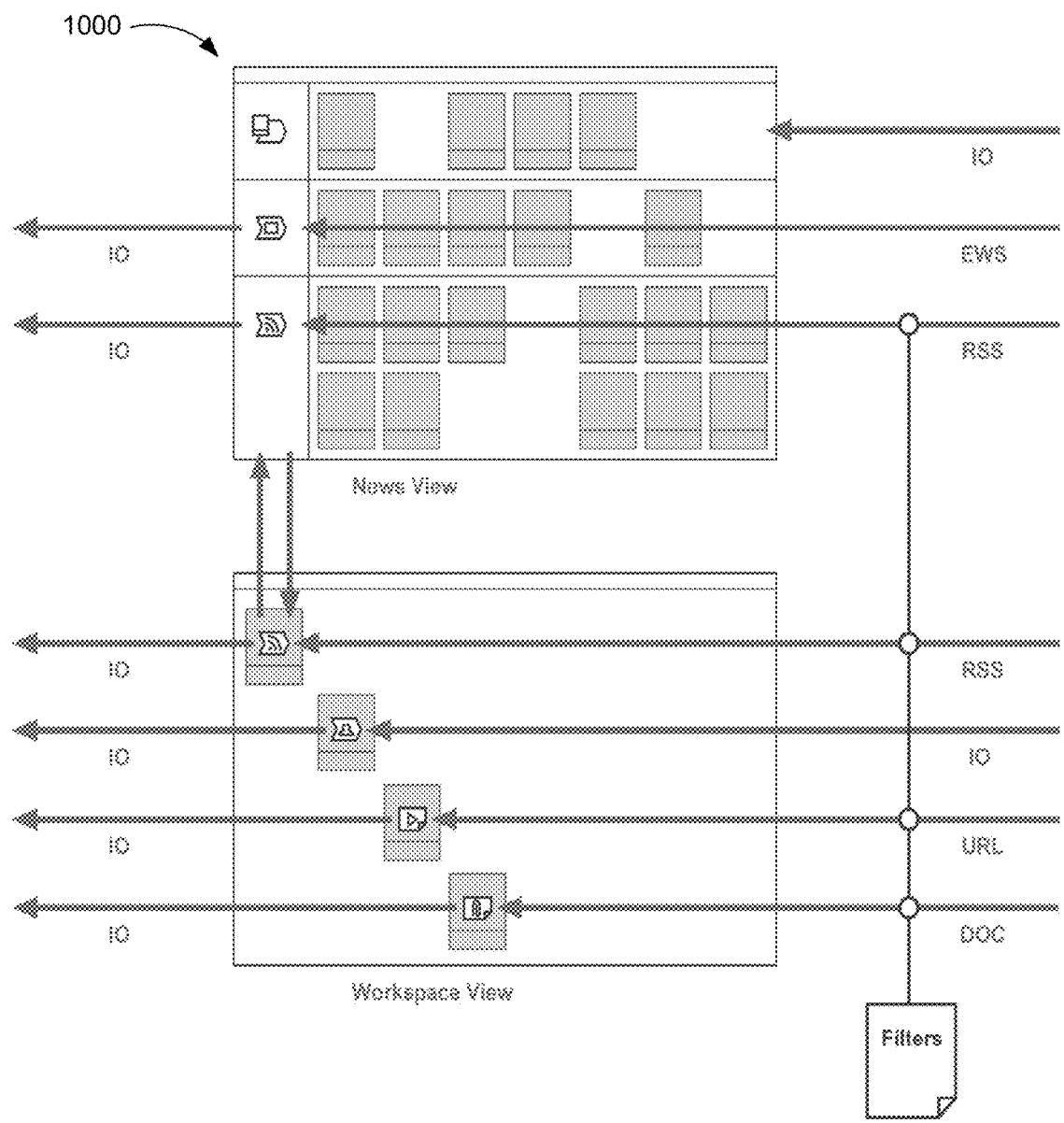
FIG. 10 is a diagram of IO Operations in accordance with one example embodiment disclosed herein.

FIG. 10 is a diagram of IO operations including IO creation. IOs can be created manually or automatically. The automatic creation converts a non-IO object or file into an IO if a user imports a non-IO file from any application into an IV. For example, if a user drags a URL of an item for sale on the Amazon web site onto the Workspace View, the resulting IO would display an image of the item in the Picture Bar, the name of the item in the Heading Bar, the cost of the item in the Value Bar, and hyperlinks to the Amazon web site where the item is advertised. Filters include the rules and manage the conversion from non-IO files to IOs.

Generally, IOs can be manually created such as by creating a blank IO and then specifying an information source to which that IO refers. The IO look can be complemented with a picture, explanatory text, a heading and other visual attributes by simply dragging and dropping pictures and text fragments onto the IO. Alternatively, in another mode, IOs can be semi-automatically created in a Workspace View or on a desktop by dragging an information object such as hyperlink, document, file or URL onto the Workspace View in which case a new IO is automatically formed and associated with the hyperlinked data, file or document. The IO picture and the IO heading are added automatically if an appropriate picture and heading can be extracted from the dragged information object or if an appropriate picture can be found in a database that matches the file name or within some of the content of the dragged information object. In yet another mode, an automated IO creation process can traverses a set of records or files, such as a database or file system or all web pages within a certain URL and can perform automatic creation of IOs from each database record, web page, or file. As an example, entire databases or file systems or all documents below or within a certain URL or domain on the Internet can automatically be converted into IOs using the semi-automatic creation of IOs but in a non-manual way that does not require a user dragging and dropping of each file, document or URL onto a view.

The following Workspace View examples detail several exemplary user interactions with IOs and IVs. A user can drag a URL from a web browser onto a Workspace View which will create an IO that hyperlinks to that URL and automatically extracts (from the URL destination) a picture and a heading that is displayed in the IO's picture and heading bar. The user can drag an RSS URL onto a Workspace View which will create an IO that visualizes the most recent item in the RSS file/s and that continuously updates itself. The user can drag a regular document (file) onto a Workspace View which will create an IO with the document attached. Dragging a document onto an IO also attaches the document. The user can import an IO from another user into the Workspace View which will create an IO copy that is synchronized with the original IO. The user can drag an IO from the Workspace View to the computer desktop which will create an IO file. The user can drag an IO from a News View row to the Workspace View which will create an IO copy that is synchronized with the original IO. The user can drag a News View Row to the Workspace View which will create an IO that visualizes the most recent item in the RSS file/s and that continuously updates itself. In another embodiment, a user can drag a buddy icon from an instant messaging system onto the IO or drag an IO the buddy icon to initiate a conversation or to link the "buddy" to the IO. In this manner, links are formed between the information object and one of the plurality of participants by selecting the information object and selecting the participant from a displayed list of participants and the system 110 associates participants and information objects by indicating a connection between an icon from an instant messaging system and the information object.

The following News View examples detail several exemplary user interactions with IOs and IVs. The user can drag one or more RSS URLs onto a News View row which will add and displays the content of RSS URLs on the News View row as a sequence of IOs. The user can drag and drop a Workspace View ID onto a News View row which will display IO additions and modification on that Workspace. The user can drag and drop an IO onto a News View row which will add that IO to the IO sequence. The user can drag an IO from a News View row to the computer desktop which will create an IO. The user can drag a News View row to the computer desktop which will create an IO.

Figure 11:
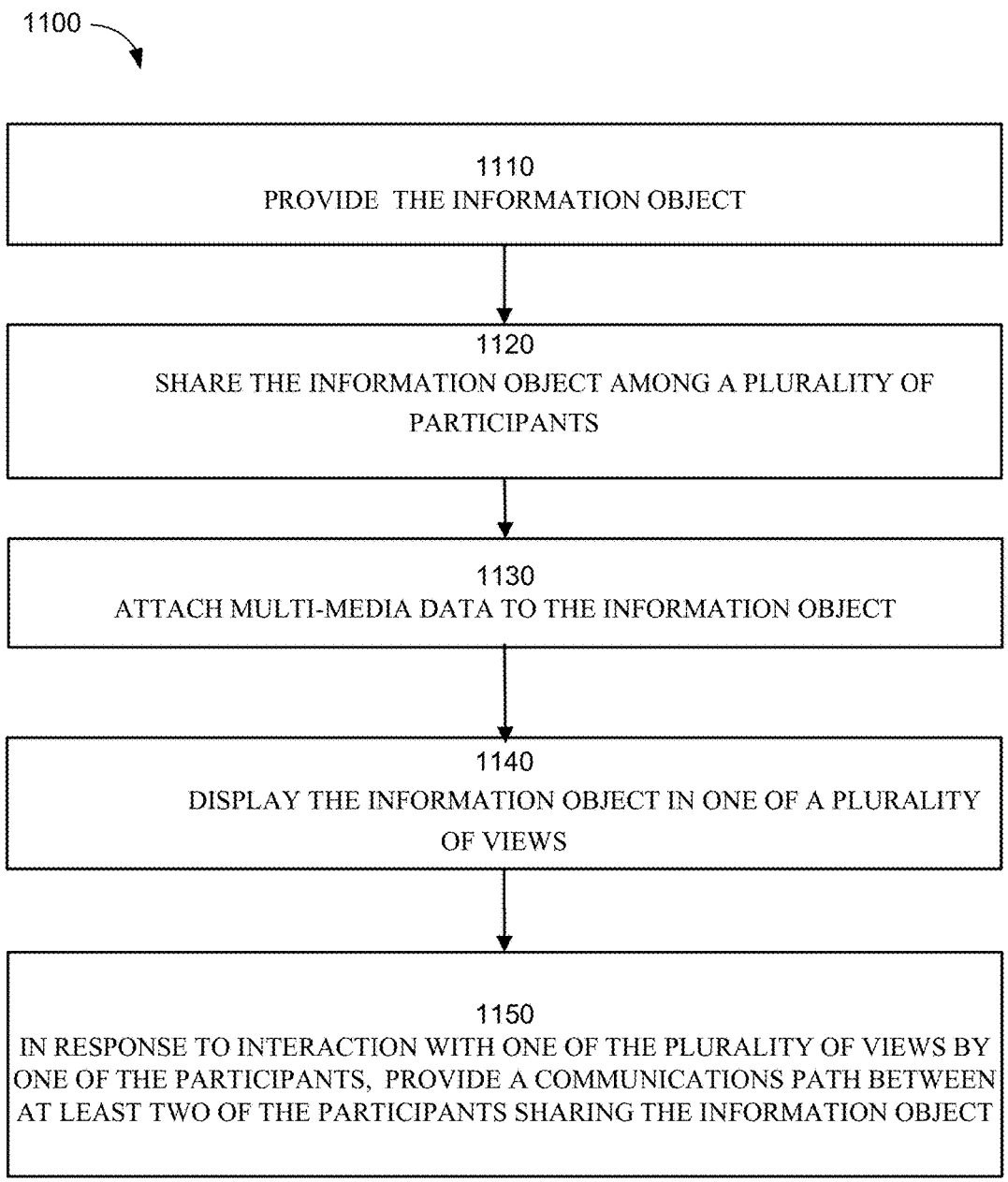
FIGS. 11-13 are flow charts of processing steps performed to the in accordance with embodiments disclosed herein.

FIG. 11 diagrams the overall process of interacting with an information object. In step 1110, the system provides the information object (I/O), for example on a GUI display as described above. A new IO can be created from scratch or by using a filter, or an existing IO can be shared, copied, transferred, etc. as described above. Next, in step 1120, the IO is shared among a plurality of participants. In step 1130, multi-media data can be optionally attached to the information object. In step 1140, the information object is displayed in one of a plurality of views. Finally in step 1150, in response to interaction with one of the plurality of views by one of the participants, a communications path between at least two of the participants sharing the information object is provided by the connection manager 180.

Figure 12:
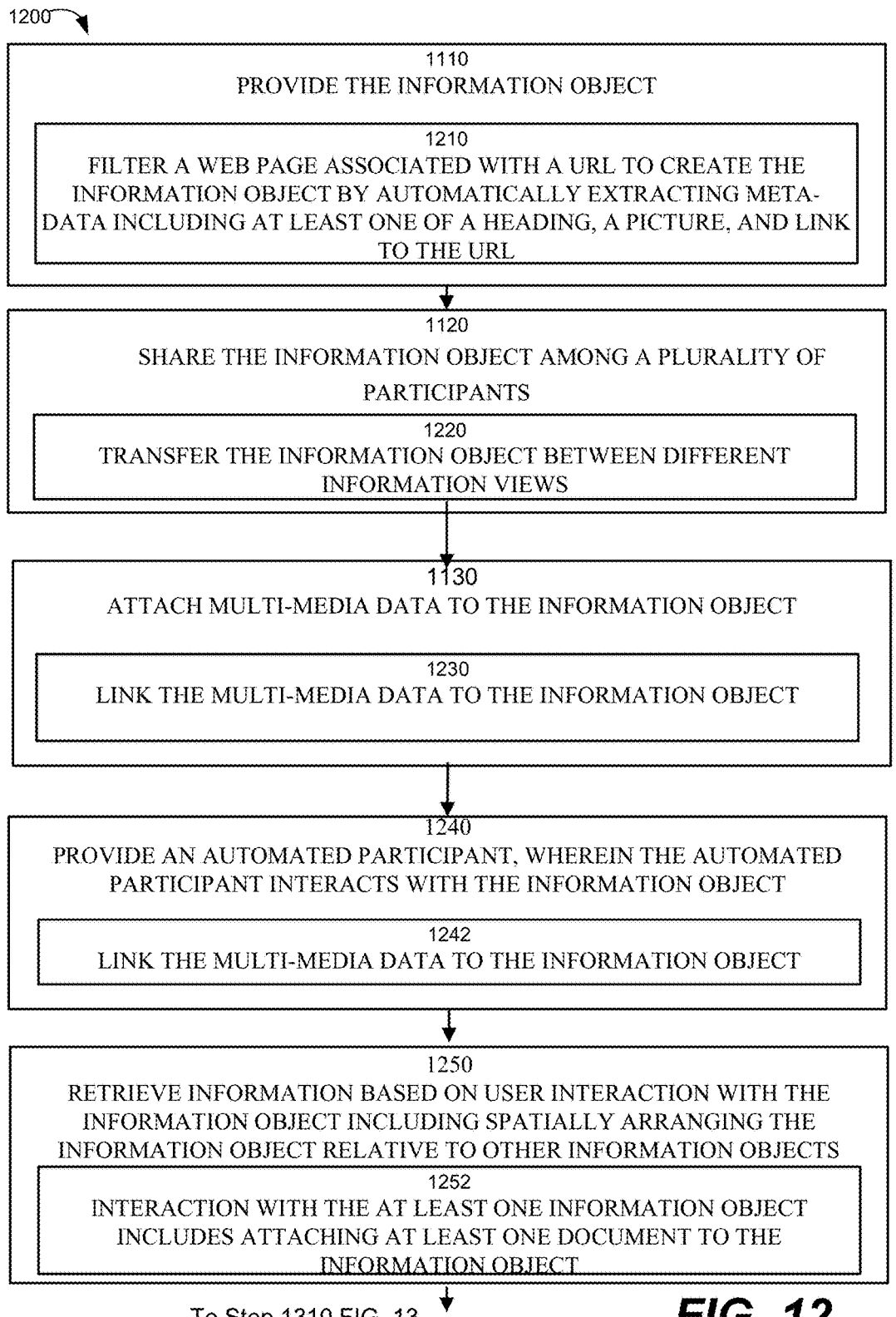

FIG. 12 is a flow chart of processing steps showing additional details in conjunction with flow char 1100 FIG. 11, that system 110 performs to allow interactions with an information object in accordance with embodiments disclosed herein. In one embodiment, step 1210 provides the information object by filtering a web page associated with a URL to create the information object by automatically extracting meta-data including at least one of a heading, a picture, and link to the URL. In step 1220, the information object is shared among a plurality of participants by transferring the information object between different information views. In step 1230, the multi-media data is linked to the information object In step 1240, an automated participant is provided. The automated participant interacts with the information object. In some embodiments, there is no distinction between a user and an automated participant (e.g., a participant based on a computational system). In step 1250, information is retrieved based on user interaction with the information object including spatially arranging the information object relative to other information objects. In step 1252, interaction with the information object includes attaching at least one document to the information object.

Figure 13:
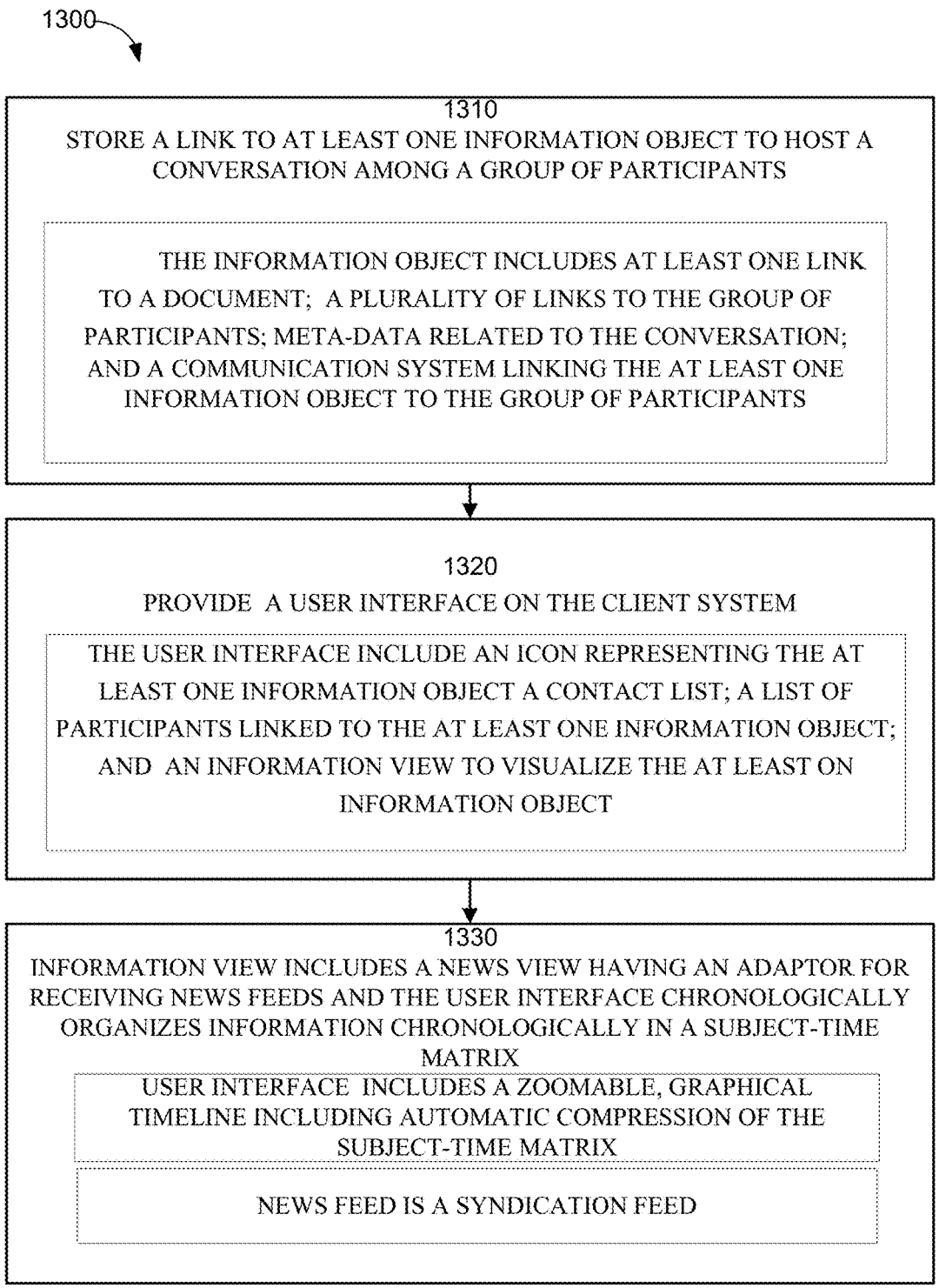
Figure 6A:
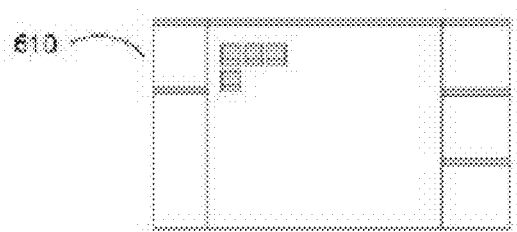
Figure 6B:
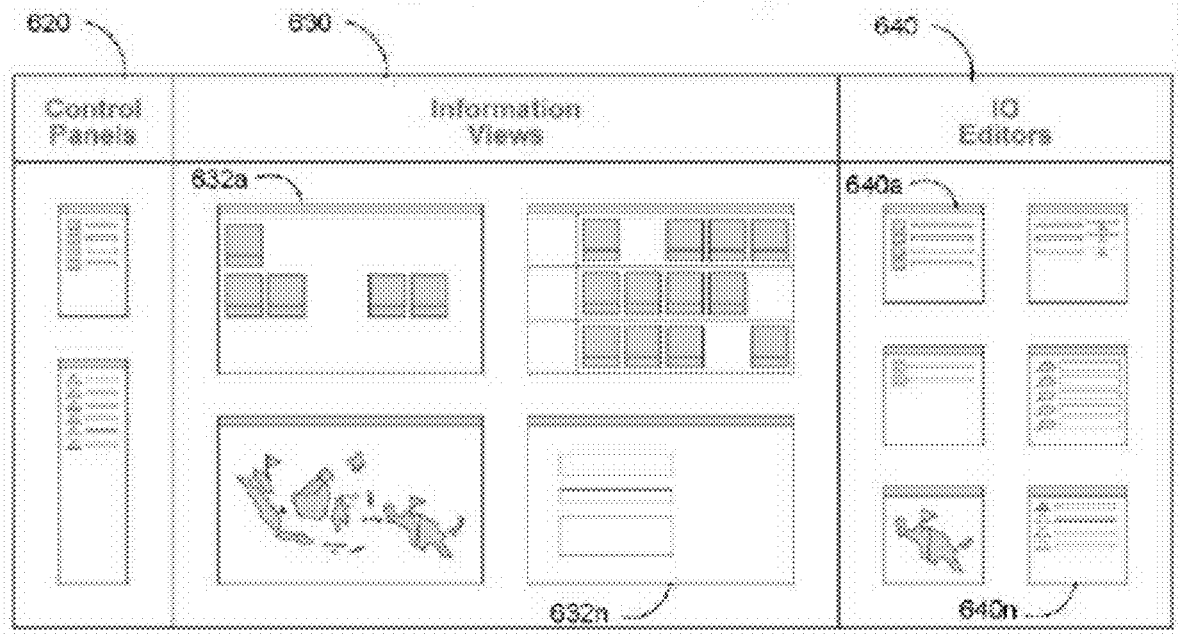

FIG. 13 is a flow chart of processing steps that system 110 performs to support a hosted conversation among a group of participants including interactions with an information object in accordance with embodiments disclosed herein. In step 1310, a link to at least one information object is stored to host a conversation among a group of participants. The information object includes at least one link to a document; a plurality of links to the group of participants; meta-data related to the conversation; and a communication system linking the at least one information object to the group of participants provided by connection manager 180.

In step 1320, a user interface on the client system is provided. The user interface includes an icon representing the at least one information object a contact list; a list of participants linked to the at least one information object; and an information view to visualize the at least on information object. In step 1330, an Information View is displayed that includes a News View having an adaptor for receiving news feeds and the user interface chronologically organizes information chronologically in a subject-time matrix. The user interface further includes a zoomable, graphical timeline including automatic compression of the subject-time matrix and in one embodiment the news feed is a syndication feed.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above.

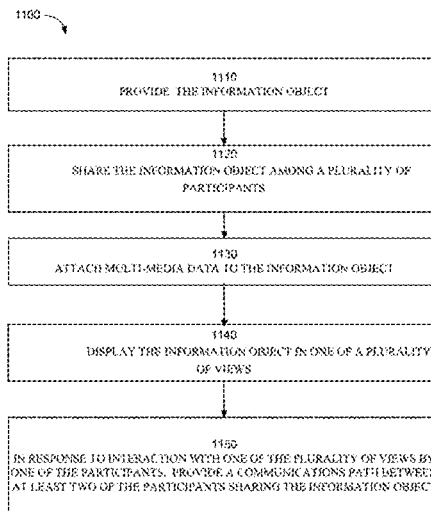

What is claimed is:

1. A computer-implemented method, in which at least one computer initiates execution of software instructions to perform computer processes, the method being for interacting with at least one data item obtained from at least one source and rendering the at least one data item accessible from a database system, wherein the at least one source is external to the database system, the computer processes comprising:
   configuring each of the data items into a distinct information object by extracting, from each data item, extracted data including a picture, a heading, and a link to the data item;
   storing data corresponding to each of the information objects in the database system;
   using the extracted data from a plurality of the data items to make available for display a representation of each of at least two of the information objects in the database system, the at least two information objects being selected for display, the representation being in a uniform format, wherein the format includes a card, and, within the card, in uniform locations thereof, the picture, the heading, a set of indicators, and a function mechanism giving graphical access to a set of functions,
   wherein the functions include:
      an instant messaging function, by which users having access to the card can exchange author- and time-stamped messages relating to the information object, such messages being associated with the information object and accessible to users who view the information object;
      a vote function, by which each user having access to the card can provide one vote for the information object;
      a replicate function, by which each user having access to the card in a first collection of cards can cause the card to be replicated in a second collection of cards; and
      a link function, by which each user having access to the card can invoke the link to the data item; and
   wherein the indicators include:
      a message indicator that displays a number of instant messages associated with the information object; and
      a vote indicator that displays a number of votes associated with the information object; and
   wherein the database system is configured to allow (i) each user to have at least one user-selected collection of cards in the database system and (ii) each card in the database system, with any associated picture and heading, and other associated data, regardless of the collection in which it may have first appeared, to be accessible and replicable across card collections of users.

2. A method according to claim 1, the computer processes further comprising:
   providing a user interface having a graphical button, which, when invoked while content is being displayed, causes the displayed content to be handled as one of the data items, namely, by configuring the displayed content as a new information object and making a representation of the new information object available for display in the uniform format.

3. A method according to claim 1, wherein the format includes within the card an indication of a date of creation of the card.

4. A method according to claim 3, wherein the one of the indicators changes its appearance to indicate the presence of a message, associated with the information object, that has not yet been read by the user.

5. A method according to claim 1, wherein the format includes a user-accessible report relating to users who replicated the information object.

6. A method according to claim 1, wherein the information object is configurable to include a user-accessible file attachment.

7. A method according to claim 1, wherein the one of the indicators indicates the presence of a geographic location, associated with the information object.

8. A method according to claim 1, further comprising:
   further causing to be displayed, at the same time as the representation, a map including a location, marked on the map, associated with at least one of the information objects.

9. A method according to claim 8, further comprising:
   responsive to a graphical input applied to the displayed location, causing the location on the map to be edited in accordance with the graphical input.

10. A method according to claim 1, further comprising:
    serving, to a client computing device of a first user, a first view of a first set of information objects that constitute a first collection of the first user;
    also serving, to the client computing device of the first user, a second view of a second set of information objects, that constitute a second collection of the first user;
    responsive to (i) a graphical selection, by the first user, of an information object in the first view and (ii) a copy command that has been graphically entered by the first user, causing the selected information object to be copied from the first view to the second view.

11. A method according to claim 1, further comprising:
    serving, to a client computing device of a first user, a first view of a first set of information objects that constitute a first collection of the first user;
    also serving, to the client computing device of the first user, a second view of a second set of information objects, that constitute a collection of a second user.

12. A method according to claim 11, further comprising:
    responsive to (i) a graphical selection, by the first user, of an information object in the second view and (ii) a copy command that has been graphically entered by the first user, causing the selected information object to be copied from the second view to the first view, so that the selected information object in the collection of the second user has been copied to the first collection of the first user.

13. A method according to claim 11, further comprising:
responsive to (i) a graphical selection, by the first user, of an information object in the first view and (ii) a send command that has been graphically entered by the first user, causing the selected information object to be sent to the second user, so that the selected information object in the collection of the first user is made available to the second user to be included in the collection of the second user.

14. A method according to claim 1, further comprising:
on a user-entered command, causing an information object to be shared with another user when the information object and the other user have been graphically selected.

15. A method according to claim 1, further comprising:
on a user-entered command, causing an information object to be shared with another user via an instant message sent through an integrated instant messaging system as a result of graphical selection by a first user.

16. A method according to claim 1, further comprising causing shared information objects to be synchronized with one another.

17. A method according to claim 1, further comprising:
serving, to a client computing device of a first user, a first view of a first set of information objects that constitute a first collection of the first user;
also serving, to the client computing device of the first user, a second view of a second set of information objects, outside of the first collection, wherein any given member of the second set of information objects is both included in a collection of another user and the other user has been selected by the first user; and wherein each of the information objects in the second view can, on a user-entered command, be caused to be copied to the first view.

18. A method according to claim 17, wherein each of the information objects in the second view is displayed in an order determined by a criterion selected from the group consisting of the information object's creation time, its access time, and combinations thereof.

19. A method according to claim 1, further comprising:
serving, to a client computing device of a first user, a first view of a first set of information objects that constitute a first collection of the first user;
also serving, to the client computing device of the first user, a second view of a second set of information objects, outside of the first collection, that are related to one or more information objects in the first collection as a result of being in one or more collections, of other users, that also include at least one of the information objects in the first collection; wherein each of the information objects in the second view can, on a user-entered command, be caused to be copied to the first view.

20. A method according to claim 1, further comprising:
serving, to a client computing device of a first user, a view of a first set of information objects that constitute a collection of the first user;
serving, to a client computing device of a second user, a view of a first set of information objects that constitute a collection of the second user;
storing the information objects in a database, each of the information objects being stored in association with data pertinent thereto including
any users thereof,
spatial location thereof in the workspace view,
content and metadata thereof, such metadata including comments and votes,
times of storage, viewing and copying thereof,
relationship thereof to any other information objects; and
processing information object data in the database to make a recommendation to the first user, wherein the recommendation is based on at least one of the criteria in the group consisting of:
number of direct and indirect relations of information objects in the collection of the first user with another information object in the database;
addition of a first pair of information objects to a collection of another user in short interval of time, of which one of the first pair of information objects is already in the collection of the first user;
presence of a second pair of information objects in the collection of the other user in close spatial proximity to one another, of which one of the second pair of information objects is already in the collection of the first user;
presence of a given information object in a row or column of information objects in the collection of the other user, wherein one of the information objects in the row or column is already in the collection of the first user;
popularity of an information object in the database, based on a popularity measure selected from the group consisting of number of users, number of views, number of copies made, number of comments made, number of votes, and combinations thereof;
presence of an information object from a second user with whom the first user previously exchanged information objects, comments or votes;
and combinations thereof.

21. A method according to claim 20, wherein the processing to make the recommendation includes processing to recommend an information object that is not in the collection of the first user.

22. A method according to claim 20, wherein the processing to make the recommendation includes processing to recommend another user who created an information object that is selected based on at least one of the criteria.

* * * * *

UNITED STATES PATENT AND TRADEMARK OFFICE
CERTIFICATE OF CORRECTION

PATENT NO. : 9,817,562 B2
APPLICATION NO. : 15/243497
DATED : November 14, 2017
INVENTOR(S) : Paul Erich Keel et al.

It is certified that error appears in the above-identified patent and that said Letters Patent is hereby corrected as shown below:

On the Title Page

Please replace the Title Page with the attached Title Page showing corrected number of drawing sheets.

In the Drawings

Sheet 6 of 15, drawing label "FIG. 6A" should appear beside the top figure and drawing label "FIG. 6B" should appear below the bottom figure as shown on the attached drawing sheet.

Sheet 7 of 15, delete Figure 6B since it is duplicative of Figure 6C.

In the Specification

In Column 22, Lines 32 and 33, replace "642a-642n" with --640a-640n--.

Signed and Sealed this
Thirteenth Day of March, 2018

Andrei Iancu
*Director of the United States Patent and Trademark Office*

(12) United States Patent
Keel et al.

(10) Patent No.: US 9,817,562 B2
(45) Date of Patent: Nov. 14, 2017

(54) METHODS AND APPARATUS FOR MANAGING AND EXCHANGING INFORMATION USING INFORMATION OBJECTS

(71) Applicants: Paul Erich Keel, Cambridge, MA (US); Jeffrey Huang, Lausanne (CH)

(72) Inventors: Paul Erich Keel, Cambridge, MA (US); Jeffrey Huang, Lausanne (CH)

(73) Assignee: Paul Erich Keel, Cambridge, MA (US)

( * ) Notice: Subject to any disclaimer, the term of this patent is extended or adjusted under 35 U.S.C. 154(b) by 0 days.

(21) Appl. No.: 15/243,497

(22) Filed: Aug. 22, 2016

(65) Prior Publication Data
US 2016/0357874 A1 Dec. 8, 2016

Related U.S. Application Data

(63) Continuation of application No. 14/664,178, filed on Mar. 20, 2015, now Pat. No. 9,524,090, which is a
(Continued)

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0482* (2013.01); *G06F 3/04817* (2013.01);
(Continued)

(58) Field of Classification Search
CPC .......... G06F 17/30864; G06F 17/3089; G06F 3/0482; G06F 17/30867; G06F 3/04817; G06F 17/30247; G06F 8/10; G06F 17/248; G06F 17/30911; G06F 17/30265; G06F 3/048; G06F 17/30598; G06F 17/241;
(Continued)

(56) References Cited

U.S. PATENT DOCUMENTS 5,008,853 A 4/1991 Bly et al. ............... 364/900
5,220,657 A 6/1993 Bly et al. ............... 395/425
(Continued)

OTHER PUBLICATIONS

Winston et al., *EWall: Electronic Card Wall*, ONR CKM Workshop, Jan. 2004, 20 pages. Publication date unknown.
(Continued)

*Primary Examiner* — Tadeese Hailu
(74) *Attorney, Agent, or Firm* — Sunstein Kann Murphy & Timbers LLP

(57) ABSTRACT

A computer-implemented method of interacting with at least one data item includes configuring each of the data items into a distinct information object by extracting, from each data item, extracted data including a heading, a source, graphical and textual material, and a hyperlink. The method additionally uses the extracted data to make available for display a representation of each of the information objects in a uniform format, wherein the format includes a card, and, within the card, an icon area for graphical and textual material, the heading, the source, a set of indicators, and a mechanism giving graphical access to a set of functions.

22 Claims, 14 Drawing Sheets